US006438659B1

(12) United States Patent
Bauman et al.

(10) Patent No.: US 6,438,659 B1
(45) Date of Patent: Aug. 20, 2002

(54) DIRECTORY BASED CACHE COHERENCY SYSTEM SUPPORTING MULTIPLE INSTRUCTION PROCESSOR AND INPUT/OUTPUT CACHES

(75) Inventors: Mitchell A. Bauman, Circle Pines; Eugene A. Rodi, Minneapolis, both of MN (US); Douglas E. Morrissey, Allentown, PA (US)

(73) Assignee: Unisys Corporation, Blue Bell, PA (US)

( * ) Notice: Subject to any disclaimer, the term of this patent is extended or adjusted under 35 U.S.C. 154(b) by 155 days.

(21) Appl. No.: 09/645,233

(22) Filed: Aug. 24, 2000

Related U.S. Application Data

(62) Division of application No. 09/001,598, filed on Dec. 31, 1997.

(51) Int. Cl.[7] .............................................. G06F 12/08
(52) U.S. Cl. ........................ 711/141; 711/144; 711/145; 711/156
(58) Field of Search ................................ 711/141, 118, 711/119, 144, 146, 145, 154, 152, 148, 149, 156, 206, 207, 208; 710/39, 132, 21, 5

(56) References Cited

U.S. PATENT DOCUMENTS 5,297,269 A * 3/1994 Donaldson et al. ......... 711/145
5,680,576 A * 10/1997 Laudon ...................... 711/145
5,717,897 A * 2/1998 McCrory ...................... 707/8

(List continued on next page.)

OTHER PUBLICATIONS

Agarwal et al., "An Evaluation of Directory Schemes for Cache Coherence", ACM International Conference on Computer Architecture, pp. 280–298, 1988.*

Marquardt et al. "A Cache–Coherent, Distributed Memory Multiprocessor–System", Conference on High Performance Networking and Computing, pp. 466–475, 1989.*

M. Ligure, "Are Crossbars Really Dead?: The Case for Optical Multiprocessor Interconnect Systems", Proceedings of the International Conference on Computer Architecture, pp. 106–115, 1995.*

Carter et al., "Techniques for Reducing Consistency–Related Communication in Distributed Shared–Memory Systems", ACM Transactions on Computer Systems (TOCS), pp. 205–243, Aug. 1995.*

*Primary Examiner*—Matthew Kim
*Assistant Examiner*—Pierre M. Vital
(74) *Attorney, Agent, or Firm*—Michael B. Atlass; Charles A. Johnson; Mark T. Starr

(57) ABSTRACT

A directory-based cache coherency system is disclosed for use in a data processing system having multiple Instruction Processors (IP) and multiple Input/Output (I/O) units coupled through a shared main memory. The system includes one or more IP cache memories, each coupled to one or more IPs and to the shared main memory for caching units of data referred to as cache lines. The system further includes one or more I/O memories within ones of the I/O units, each I/O memory being coupled to the shared main memory for storing cache lines retrieved from the shared main memory. Coherency is maintained through the use of a central directory which stores status for each of the cache lines in the system. The status indicates the identity of the IP caches and the I/O memories having valid copies of a given cache line, and further identifies a set of access privileges, that is, the cache line "state", associated with the cache line. The cache line states are used to implement a state machine which tracks the cache lines and ensures only valid copies of are maintained within the memory system. According to another aspect of the system, the main memory performs continuous tracking and control functions for all cache lines residing in the IP caches. In contrast, the system maintains tracking and control functions for only predetermined cache lines provided to the I/O units so that system overhead may be reduced. The coherency system further supports multiple heterogeneous instruction processors which operate on cache lines of different sizes.

8 Claims, 8 Drawing Sheets

U.S. PATENT DOCUMENTS

| | | | | |
|---|---|---|---|---|
| 5,787,477 A | * | 7/1998 | Rectschaffen et al. | 711/141 |
| 5,809,536 A | * | 9/1998 | Young et al. | 711/144 |
| 5,822,763 A | * | 10/1998 | Baylor et al. | 711/141 |
| 5,860,126 A | * | 1/1999 | Mittal | 711/141 |
| 5,867,723 A | * | 2/1999 | Chin et al. | 711/114 |
| 5,900,015 A | * | 5/1999 | Herger et al. | 711/141 |
| 5,930,822 A | * | 7/1999 | Chaney et al. | 711/150 |
| 5,933,849 A | * | 8/1999 | Srbljic et al. | 711/118 |
| 5,940,860 A | * | 8/1999 | Hagersten et al. | 711/141 |
| 5,987,506 A | * | 11/1999 | Carter et al. | 711/147 |
| 6,094,686 A | * | 7/2000 | Sharma | 710/29 |
| 6,108,752 A | * | 8/2000 | VanDoren et al. | 711/143 |
| 6,122,714 A | * | 9/2000 | VanDoren et al. | 711/121 |
| 6,134,636 A | * | 10/2000 | Matthews et al. | 711/150 |
| 6,249,520 B1 | * | 6/2001 | Steely et al. | 370/357 |
| 6,289,382 B1 | * | 9/2001 | Bowman-Amuah | 709/226 |

* cited by examiner

PROCESSING MODULE (POD)

SUB-PROCESSING MODULE (SUB-POD)

OWNERSHIP FORMAT:

DIRECTORY STORAGE INFORMATION BITS - SHARED FORMAT

MSU STORAGE ALGORITHM

| REQUESTER ID 820 | COMMAND 810 | REQUESTED ADDRESS 830 | LINK 840 |
|---|---|---|---|
| | | | |
| | | | |
| | | | |
| | | | |
| | | | |
| | | | |

DEFERRED REQUEST TABLE (DRT)

FIG. 8

DIRECTORY BASED CACHE COHERENCY SYSTEM SUPPORTING MULTIPLE INSTRUCTION PROCESSOR AND INPUT/OUTPUT CACHES

CROSS-REFERENCE TO OTHER APPLICATIONS

This application is a Division of Ser. No. 09/001,598 filed Dec. 31, 1997.

The following co-pending applications of common assignee contain some common disclosure:

"A Directory-Based Cache Coherency System", filed Nov. 5, 1997, U.S. application Ser. No. 08/965,004, and incorporated herein by reference in its entirety;

"Memory Optimization State", filed Nov. 5, 1997, U.S. application Ser. No. 08/964,626, now U.S. Pat. No. 6,052,760, issued Apr. 18, 2000, and incorporated herein by reference in its entirety;

"High-Performance Modular Memory System with Crossbar Connections", filed Dec. 31, 1997, U.S. application Ser. No. 09/001,592, and incorporated herein by reference in its entirety; and "High-Speed Memory Storage Unit for a Multiprocessor System Having Integrated Directory and Data Storage Subsystems", filed Dec. 31, 1997, U.S. application Ser. No. 09/001,588, and incorporated herein by reference in its entirety.

BACKGROUND OF THE INVENTION

1. Field of the Invention

This invention relates generally to a cache coherency scheme for a large-scale symmetrical multiprocessor system; and, more specifically, to an improved directory-based cache coherency scheme for supporting one or more instruction processors and one or more input/output processors which are each coupled to a shared main memory and which are each capable of storing predetermined data signals retrieved from the shared main memory.

2. Description of the Prior Art

Data processing systems are becoming increasing complex. Some systems, such as Symmetric Multi-Processor (SMP) computer systems, couple two or more Instruction Processors (IPs) and multiple Input/Output (I/O) Modules to shared memory. This allows the multiple IPs to operate simultaneously on the same task, and also allows multiple tasks to be performed at the same time to increase system throughput.

As the number of units coupled to a shared memory increases, more demands are placed on the memory and memory latency increases. To address this problem, high-speed cache memory systems are often coupled to one or more of the IPs for storing data signals that are copied from main memory. These cache memories are generally capable of processing requests faster than the main memory while also serving to reduce the number of requests that the main memory must handle. This increases system throughput.

While the use of cache memories increases system throughput, it causes other design challenges. When multiple cache memories are coupled to a single main memory for the purpose of temporarily storing data signals, some system must be utilized to ensure that all IPs are working from the same (most recent) copy of the data. For example, if a copy of a data item is stored, and subsequently modified, in a cache memory, another IP requesting access to the same data item must be prevented from using the older copy of the data item stored either in main memory or the requesting IP's cache. This is referred to as maintaining cache coherency. Maintaining cache coherency becomes more difficult as more caches are added to the system since more copies of a single data item may have to be tracked.

Many methods exist to maintain cache coherency. Some earlier systems achieve coherency by implementing memory locks. That is, if an updated copy of data existed within a local cache, other processors were prohibited from obtaining a copy of the data from main memory until the updated copy was returned to main memory, thereby releasing the lock. For complex systems, the additional hardware and/or operating time required for setting and releasing the locks within main memory cannot be justified. Furthermore, reliance on such locks directly prohibits certain types of applications such as parallel processing.

Another method of maintaining cache coherency is shown in U.S. Pat. No. 4,843,542 issued to Dashiell et al., and in U.S. Pat. No. 4,755,930 issued to Wilson, Jr. et al. These patents discuss a system wherein each processor has a local cache coupled to a shared memory through a common memory bus. Each processor is responsible for monitoring, or "snooping", the common bus to maintain currency of its own cache data. These snooping protocols increase processor overhead, and are unworkable in hierarchical memory configurations that do not have a common bus structure. A similar snooping protocol is shown in U.S. Pat. No. 5,025,365 to Mathur et al., which teaches local caches that monitor a system bus for the occurrence of memory accesses which would invalidate a local copy of data. The Mathur snooping protocol removes some of overhead associated with snooping by invalidating data within the local caches at times when data accesses are not occurring, however the Mathur system is still unworkable in memory systems without a common bus structure.

Another method of maintaining cache coherency is shown in U.S. Pat. No. 5,423,016 to Tsuchiya. The method described in this patent involves providing a memory structure called a "duplicate tag" with each cache memory. The duplicate tags record which data items are stored within the associated cache. When a data item is modified by a processor, an invalidation request is routed to all of the other duplicate tags in the system. The duplicate tags are searched for the address of the referenced data item. If found, the data item is marked as invalid in the other caches. Such an approach is impractical for distributed systems having many caches interconnected in a hierarchical fashion because the time requited to route the invalidation requests poses an undue overhead.

For distributed systems having hierarchical memory structures, a directory-based coherency system becomes more practical. Directory-based coherency systems utilize a centralized directory to record the location and the status of data as it exists throughout the system. For example, the directory records which caches have a copy of the data, and further records if any of the caches have an updated copy of the data. When a cache makes a request to main memory for a data item, the central directory is consulted to determine where the most recent copy of that data item resides. Based on this information, the most recent copy of the data is retrieved so it may be provided to the requesting cache. The central directory is then updated to reflect the new status for that unit of memory. A novel directory-based cache coherency system for use with multiple Instruction Processors coupled to a hierarchical cache structure is described in the co-pending application entitled "A Directory-Based Cache Coherency System", U.S. patent application Ser. No. 08/965,004, assigned to the Assignee hereof, which is incorporated herein by reference in its entirety.

Although the foregoing discussion addresses the memory latency and cache coherency issues associated with cache memories coupled to Instruction Processors, it does not consider the problems associated with coupling an increased number of Input/Output (I/O) units to memory in an SMP system. As the number of I/O units in the system increases, it becomes desirable to allow these I/O units to maintain copies of memory data for either read or read/write purposes. This may be accomplished by coupling one or more of the I/O units to shared I/O cache memories or other I/O buffers.

The use of I/O caches and internal I/O buffers for storing copies of data obtained from a shared main memory poses some unique considerations. In some instances, it is desirable to handle this stored I/O data in a manner which is similar to the manner in which cached IP data is handled. That is, the location and state of the cached data within the I/O cache should be tracked and controlled by the main memory. In other instances, it is desirable to handle data provided to an I/O unit differently from the data copies maintained in the IP caches. For example, data may be retrieved from main memory by an I/O unit so that the copy of memory may be written to an I/O sub-system such as a disk unit. Since this copy is just considered a "snapshot" in time of the state of a portion of the main memory, there is no reason to track the copy for coherency purposes. In another situation, a block of memory data may be retrieved from main memory and stored in an I/O buffer so that data received from an I/O sub-system may be selectively merged into the stored data. When the modification is complete, the modified block of data is written back to the main memory. In these instances, the I/O unit must retain the block of data long enough to complete the merge operation, then the data must be returned to the main memory. In these instances, it would unnecessarily increase system overhead to require the shared main memory to attempted to retrieve the block of data before the merger were completed. For these reasons, different coherency restrictions should be imposed on those copies of data items stored within I/O units as compared to copies of data items stored within an IP cache.

In addition to the above-described I/O coherency issues, coupling both I/O and IP caches to a shared main memory increases the complexity associated with error detection and prevention. The error handling mechanism must be able to ensure that only legal copies of data items are stored within the various system memories.

Finally, today's complex systems may include multiple heterogeneous instruction processors. Not all of the instruction processors coupled to the same shared main memory necessarily operate on blocks of cached data that are of the same size. As such, it is desirable to have a coherency system that allows various instruction processors within a system to modify data on different memory boundaries.

Prior art directory-based coherency systems provide coherency among cache memories coupled to instruction processors, but do not track data items stored within I/O memories, and do not address the unique considerations posed by the manipulation of memory data by I/O units. Additionally, prior art systems do not provide for the modification of memory data on various memory boundaries. Finally, prior art systems do not provide the error checking necessary to maintain coherency in large complex systems coupling many instruction processors and I/O units to a common main memory.

OBJECTS

The primary object of the invention is to provide an improved control system for a directory-based cache coherency system;

A further object of the invention is to provide a directory-based cache coherency system that is capable of maintaining coherency in a system having both Instruction Processors (IPs) and Input/Output (I/O) units coupled to a shared main memory;

It is another object of the invention is to provide a coherency system capable of supporting a multiple expandable number of cache memories, and a multiple expandable number of I/O units;

A yet further object of the invention is to provide a directory-based coherency mechanism that allows IPs to cache data read from the shared main memory;

A still further object of the invention is to provide a directory-based coherency mechanism that allows an I/O unit to provide a copy of a data item to a coupled I/O sub-system while allowing the data item to remain stored in either an IP cache or a different I/O unit;

A still further object of the invention is to provide a cache coherency system that permits an I/O unit to maintain a copy of a data item within a buffer until a merge operation is completed and the I/O unit returns the data item to the main memory;

Another object of the invention is to provide a cache coherency system that maintains cache coherency when one or more I/O units overwrite data in the shared main memory system that is stored within one or more of the cache memories coupled to the shared main memory system;

A further object of the invention is to provide a cache coherency system that supports memory modifications of various block sizes within the shared main memory;

A still further object of the invention is to provide a coherency system that provides improved corruption detection for data stored within the shared main memory system.

SUMMARY OF THE INVENTION

The objectives of the present invention are achieved in a directory-based cache coherency system for use in a data processing system having multiple Instruction Processors (IP) and multiple Input/output (I/O) units coupled through a shared main memory. The system includes one or more IP cache memories, each coupled to one or more IPs and to the shared main memory for caching units of data referred to as "cache lines" from shared main memory. The system further includes one or more I/O memories within ones of the I/O units, each coupled to the shared main memory for storing cache lines. Coherency is maintained through the use of a central directory which maintains status on each of the cache lines in the system. The status indicates the identity of the IP caches and the I/O memories that store copies of a given cache line. The status further identifies a set of access privileges (for example, read or read/write privileges), referred to as a cache line "state" that is associated with the given cache line.

An IP cache or I/O memory obtains a copy of a cache line and an associated set of access privileges by issuing one of a predetermined allowable set of commands to the shared main memory. A command may cause a requested cache line to transition to a new state. The command may also cause the requested cache line to be marked as invalid because the command was not considered a valid request based on the then-existing state of the requested cache line. The predetermined cache line states and the set of allowable commands therefore define a state machine which serves to ensure only valid copies of a cache line are maintained within the memory system.

The coherency system of the current invention allows copies of the cache lines stored in IP caches to be handled differently than some copies provided to I/O units. The central directory always tracks cache line data stored in IP caches. Furthermore, the shared main memory always requires that an IP cache return a modified copy of a cache line to the shared main memory when other requests are received for that cache line. In contrast, the central directory does not track cache lines that are provided to I/O units to be saved as a snap-shot copy on an I/O sub-unit such as a disk. Moreover, I/O units are allowed to retain data for write purposes until a write operation is completed. That is, the main memory does not force an I/O unit to relinquish a cache line because another unit is making a request for that cache line. By distinguishing between IP caches and I/O memories in this manner, main memory is not forced to perform data tracking or data retrieval functions that are not necessary, which improves memory efficiency.

The memory coherency system of the current invention further includes commands to allow the shared main memory to be modified on other than strictly cache line boundaries. The system is therefore capable of supporting multiple heterogeneous instruction processors, not all of which necessarily operate on blocks of cached data that are of the same size.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

BRIEF DESCRIPTION OF THE FIGURES

The present invention will be described with reference to the accompanying drawings.

FIG. 8 is a block diagram of the Deferred Request Table (DRT), which is a storage structure used to place a cache line in the deferred state.

DETAILED DESCRIPTION OF THE PREFERRED EMBODIMENTS

System Platform

Figure 1:
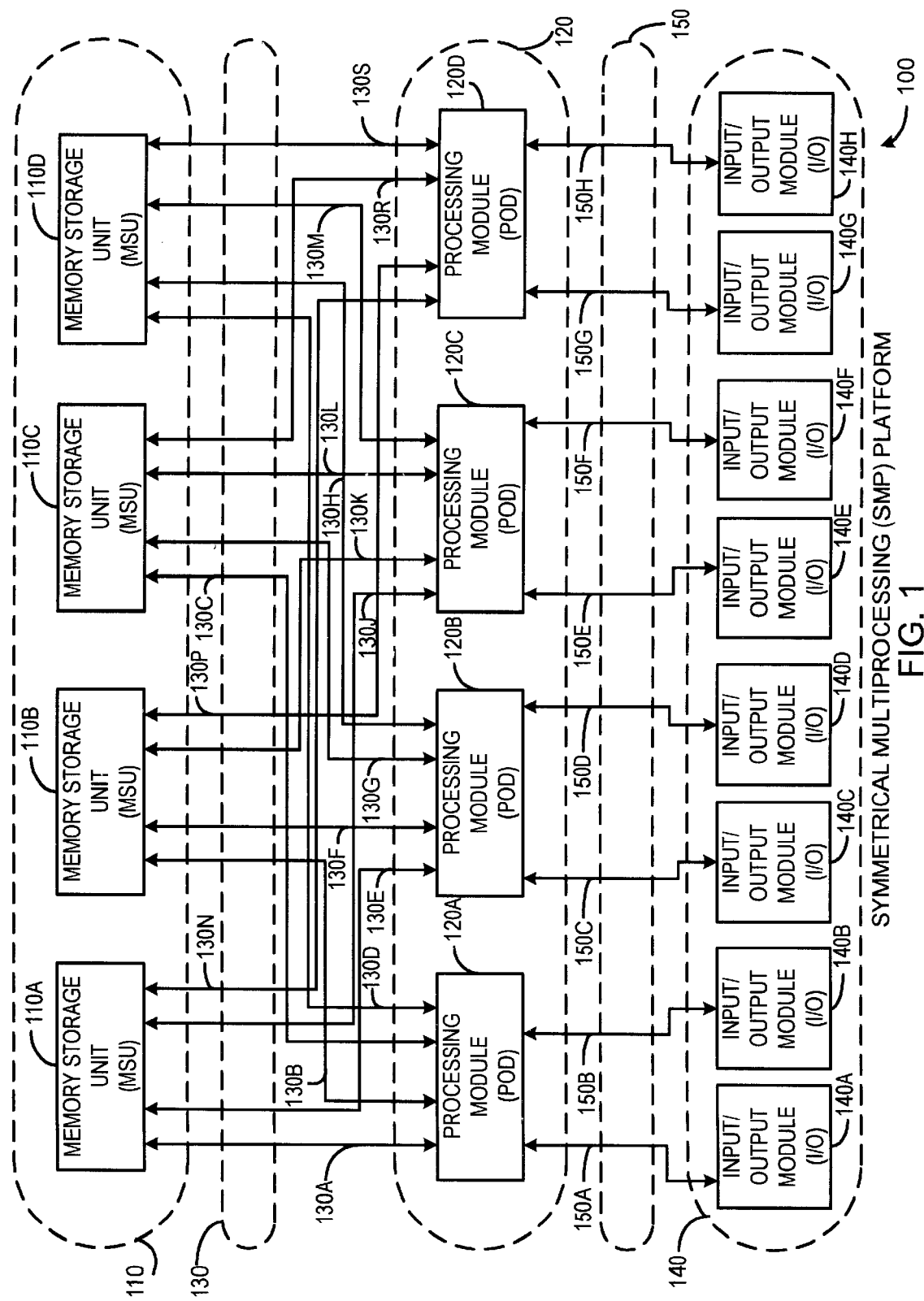
FIG. 1 is a block diagram of a Symmetrical MultiProcessor (SMP) system platform according to a preferred embodiment of the present invention.

FIG. 1 is a block diagram of a Symmetrical Multi-Processor (SMP) System Platform according to a preferred embodiment of the present invention. System Platform 100 includes one or more Memory Storage Units (MSUs) in dashed block 110 individually shown as MSU 110A, MSU 110B, MSU 110C and MSU 110D, and one or more Processing Modules (PODs) in dashed block 120 individually shown as POD 120A, POD 120B, POD 120C, and POD 120D. Each unit in MSU 110 is interfaced to all units in POD 120 via a dedicated, point-to-point connection referred to as an MSU Interface (MI) in dashed block 130, individually shown as 130A through 130S. For example, MI 130A interfaces POD 120A to MSU 110A, MI 130B interfaces POD 120A to MSU 110B, MI 130C interfaces POD 120A to MSU 110C, MI 130D interfaces POD 120A to MSU 110D, and so on.

In one embodiment of the present invention, MI 130 comprises separate bi-directional data and bi-directional address/command interconnections, and further includes unidirectional control lines that control the operation on the data and address/command interconnections (not individually shown). The control lines run at system clock frequency (SYSCLK) while the data bus runs source synchronous at two times the system clock frequency (2×SYSCLK). In a preferred embodiment of the present invention, the system clock frequency is 100 megahertz (MHZ).

Any POD 120 has direct access to data in any MSU 110 via one of MIs 130. For example, MI 130A allows POD 120A direct access to MSU 110A and MI 130F allows POD 120B direct access to MSU 110B. PODs 120 and MSUs 110 are discussed in further detail below.

System Platform 100 further comprises Input/Output (I/O) Modules in dashed block 140 individually shown as I/O Modules 140A through 140H, which provide the interface between various Input/Output devices and one of the PODs 120. Each I/O Module 140 is connected to one of the PODs across a dedicated point-to-point connection called the MIO Interface in dashed block 150 individually shown as 150A through 150H. For example, I/O Module 140A is connected to POD 120A via a dedicated point-to-point MIO Interface 150A The MIO Interfaces 150 are similar to the MI Interfaces 130, but have a transfer rate that is half the transfer rate of the MI Interfaces because the I/O Modules 140 are located at a greater distance from the PODs 120 than are the MSUs 110.

Processing Module (POD)

Figure 2:
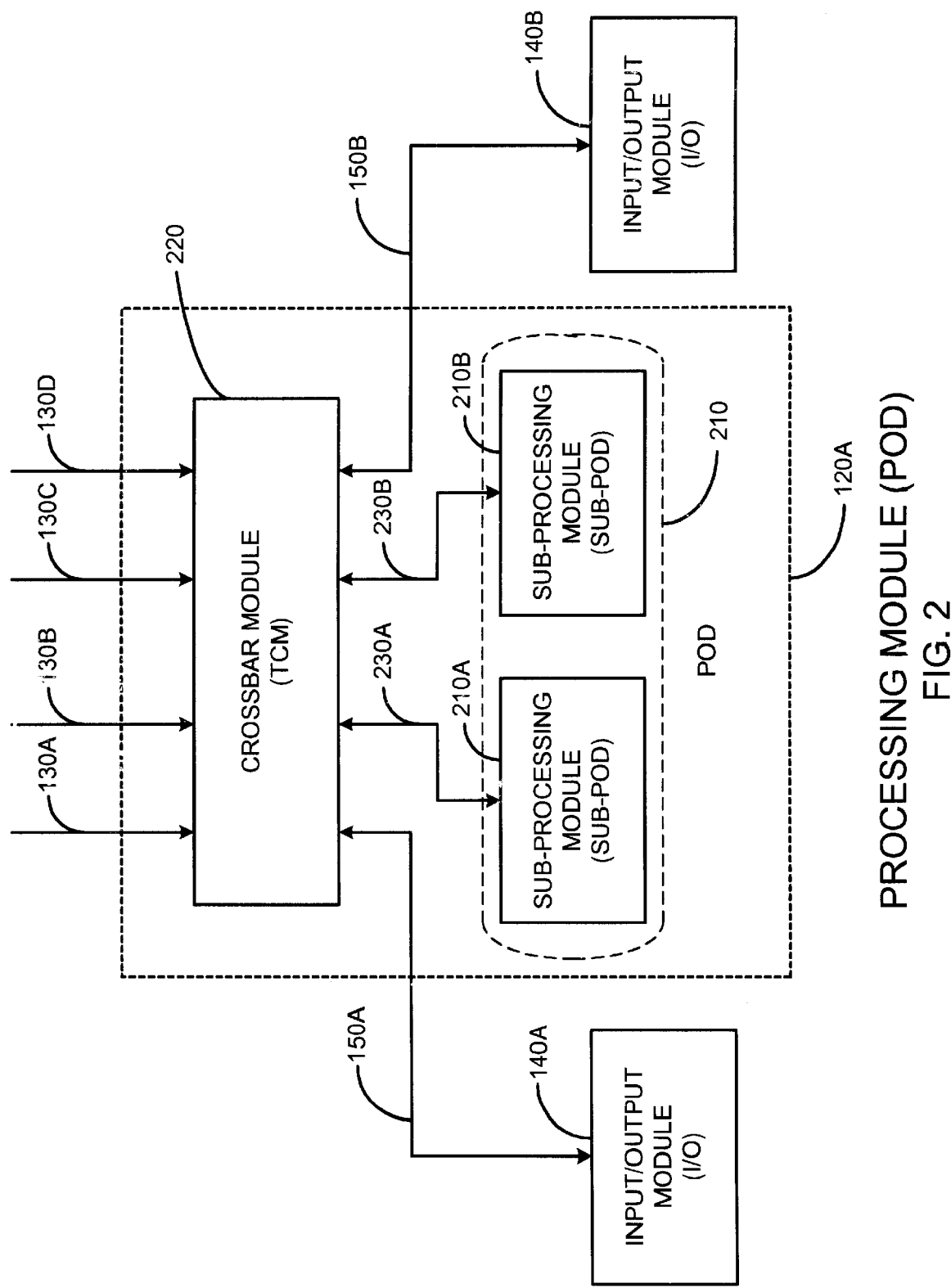
FIG. 2 is a block diagram of a Processing Module (POD) according to one embodiment of the present invention.

FIG. 2 is a block diagram of a processing module (POD) according to one embodiment of the present invention. POD 120A is shown, but each of the PODs 120A through 120D have a similar configuration. POD 120A includes two Sub-Processing Modules (Sub-PODs) in dashed block 210, individually shown as 210A and 210B. Each of the Sub-PODs 210A and 210B are interconnected to a Crossbar Module (TCM) 220 through dedicated point-to-point MT Interfaces 230A and 230B, respectively, that are similar to the MIs 130A, 130B, 130C, and 130D. TCM 220 further interconnects to one or more I/O Modules 140 via the respective point-to-point MIO Interfaces 150. TCM 220 both buffers data and functions as a switch between any of TC Interfaces 230A or 230B, or MIO Interfaces 150A or 150B, and any of the MI Interfaces 130A through 130D. That is, TCM 220 selects one of the Sub-PODs 210 or one of the I/O Modules 140 to transfer data over MI Interfaces 130 at any given point in time. When an I/O Module 140 or a Sub-POD 210 is interconnected to one of the MSUs via the TCM 220, the MSU connection is determined by the address provided by the I/O Module or the Sub-POD, respectively. In general, the TCM maps one-fourth of the memory address space to each of the MSUs 110A–110D. According to one embodiment of the current system platform, the TCM 220 can further be configured to perform address interleaving functions to the various MSUs. The TCM may also be utilized to perform address translation functions that are necessary for ensuring that each Instruction Processor (not shown in FIG. 2) and each I/O Module 140 views memory as existing within a contiguous address space.

In one embodiment of the present invention, I/O Modules 140 are external to Sub-POD 210 as shown in FIG. 2. This embodiment allows system platform 100 to be configured based on the number of I/O devices used in a particular application. In another embodiment of the present invention, one or more I/O Modules 140 are incorporated into Sub-POD 210.

I/O Module

Figure 3:
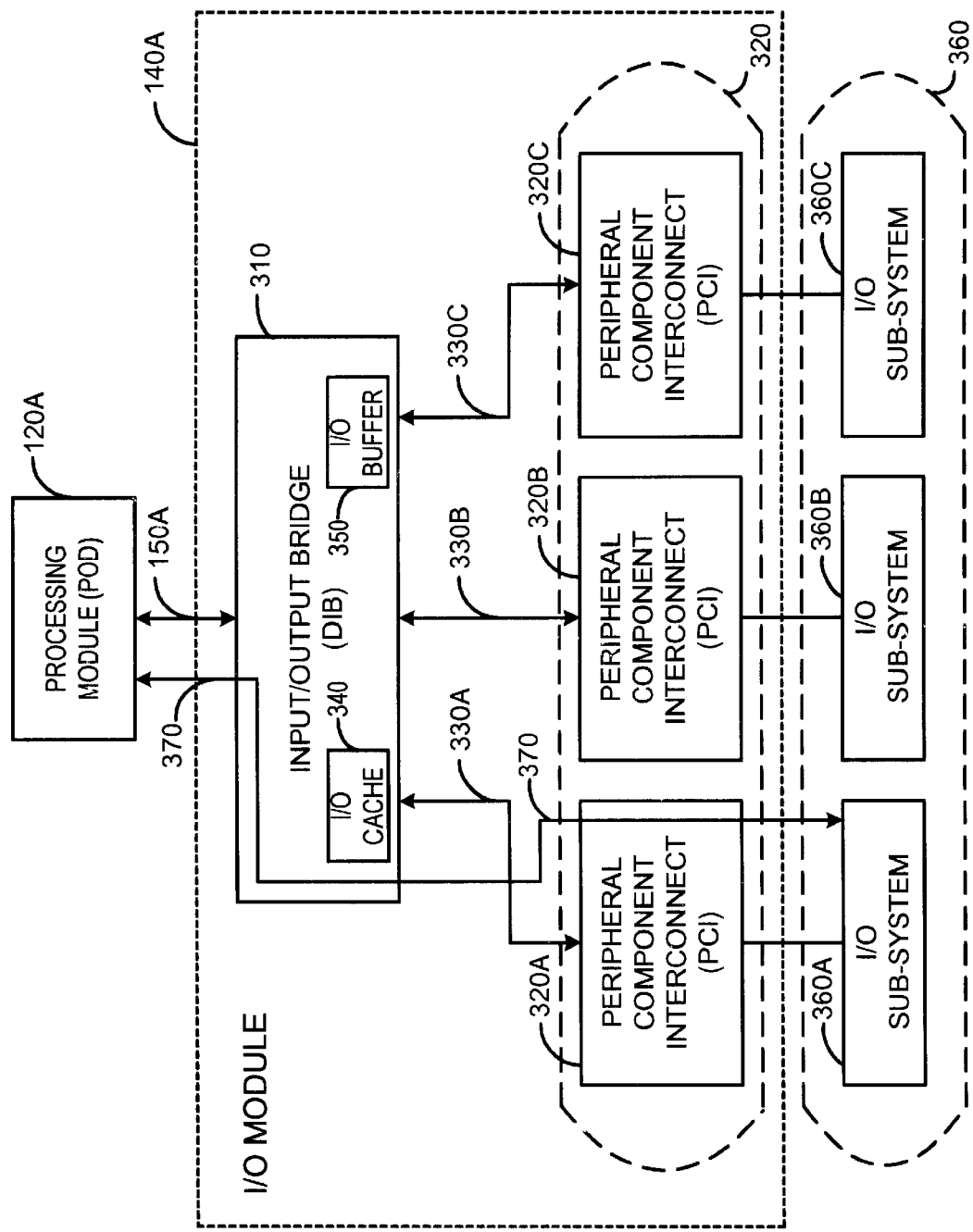
FIG. 3 is a block diagram of an I/O Module according to one embodiment of the present invention.

FIG. 3 is a block diagram of an I/O Module according to one embodiment of the present invention. I/O Module 140A and Processing Module 120A are illustrated, but it is understood that each I/O Module 140 has a similar structure and interconnection. I/O Module 140A includes a Direct Input/Output Bridge (DIB) 310 connected to one or more Peripheral Component Interconnects (PCIs) in dashed block 320, individually shown as PCI 320A, PCI 320B, and PCI 320C, via one or more dedicated PCI Interfaces 330, shown individually as PCI Interfaces 330A, 330B, and 330C, respectively. DIB 310 is also connected to POD 120A via MIO Interface 150A as is shown in FIG. 2. DIB 310 buffers data and functions as a switch between PCI Interfaces 330A, 330B, and 330C and MIO Interface 150A, allowing POD 120A access to each of PCIs 320A, 320B, and 320C, respectively. The DIB includes I/O Cache 340 coupled to each of the PCIs in the associated DIB, and used to buffer read-only data received from an MSU 110 for use by one or more of the various I/O devices associated with the PCIs. The DIB further include an I/O Buffer 350 used to buffer read/write data retrieved from an MSU 110 for the purposes of performing partial write operations. Together, I/O Cache 340 and I/O Buffer 350 may be referred to as I/O Memories. The functionality provided by these I/O Memories will be described in more detail below.

Peripheral Component Interconnect (PCI) 320 is a set of industry-standard PCI add-in cards, each of which connects multiple I/O Sub-systems in dashed block 360, individually shown as I/O Sub-systems 360A, 360B, and 360C, to I/O Module 140A via an industry-standard bus. These I/O Sub-systems 360 include, but are not limited to, SCSI controllers, LAN controllers, and video controllers, and various other disk and tape sub-systems.

In operation, memory data can be retrieved from an MSU 110, and transferred via MIO Interface 150A to an I/O Sub-system 360 such as a tape or disk sub-unit so that a copy may be created. In this instance, it is not necessary to store the memory data in either the I/O Cache 340 or the I/O Buffer 350 as is indicated by Line 370.

Memory data may also be retrieved from an MSU 110 to be stored in I/O Cache 340. Data within I/O Cache 340 is available to the I/O Sub-units 360 through the associated PCIs 320 for read-only purposes. The I/O Cache reduces system overhead by reducing the number of read requests that must be presented to an MSU.

As stated above, the data stored in the I/O Cache is available for read purposes only. When data is transferred from an I/O Module to be written to an MSU, one of two methods is utilized. When an entire contiguous block of data is to be written by an I/O Module to an MSU 110, the I/O Module performs an Overwrite operation. The contiguous data block is transferred from an I/O Sub-system such as disk directly to the MSU without being temporarily stored within an I/O Cache 340 or I/O Buffer 350 as is indicated by Line 370. The data provided by the I/O Module will overwrite whatever data signals previously were stored within the MSU. In other instances, the I/O Module is not overwriting an entire contiguous block of memory data but is instead merging data retrieved from an I/O Sub-system into selected addressable portions of a memory block. In these situations, an addressable block of memory data is copied from an MSU 110 to I/O Buffer 350. Data is then retrieved from I/O Sub-system 360 and selectively merged into I/O Buffer 350, and the entire addressable block of memory data is transferred back to the appropriate MSU. This is done so that an MSU is not forced to handle the merging process, which would diminish throughput. The manner in which these various I/O operations are supported by the cache coherency system of the current invention is discussed below.

Sub-Processing Module

Figure 4:
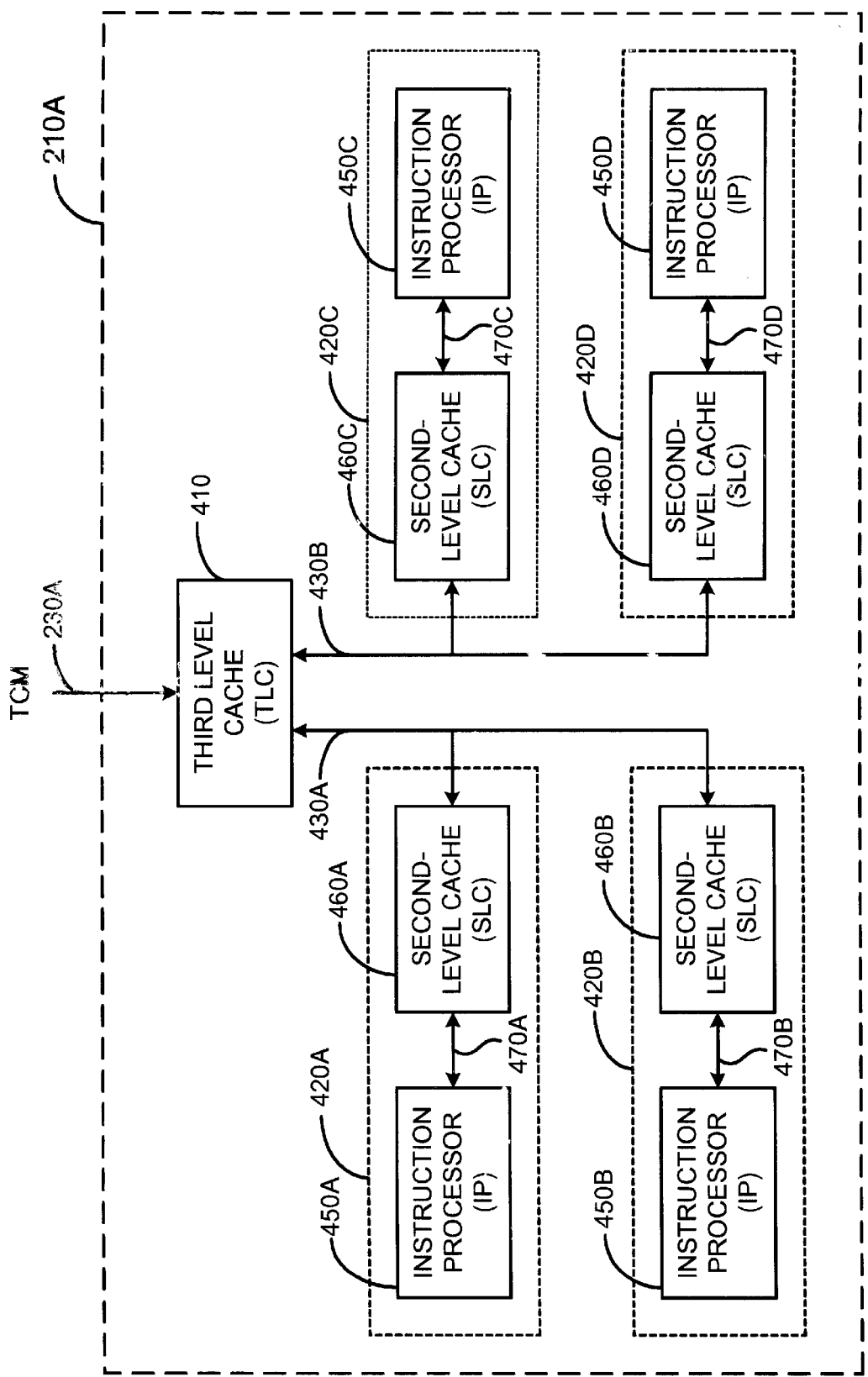
FIG. 4 is a block diagram of a Sub-Processing Module (Sub-POD) according to one embodiment of the present invention.

FIG. 4 is a block diagram of a Sub-Processing Module (Sub-POD) according to one embodiment of the present invention. Sub-POD 210A is shown, but it is understood that all Sub-PODs 210 have similar structures and interconnections. In this embodiment, Sub-POD 210A includes a Third-Level Cache (TLC) 410 and one or more Coherency Domains 420 (shown as Coherency Domains 420A, 420B, 420C, and 420D). TLC 410 is connected to Coherency Domains 420A and 420B via Bus 430A, and is connected to Coherency Domains 420C and 420D via Bus 430B. TLC 410 caches data from the MSU, and maintains data coherency among all of Coherency Domains 420, guaranteeing that each processor is always operating on the latest copy of the data.

Each Coherency Domain 420 includes an Instruction Processor (IP) 450 (shown as IPs 450A, 450B, 450C, and 450D), and a Second-Level Cache (SLC) 460 (shown as SLC 460A, 460B, 460C and 460D.) Each SLC interfaces to an IP via a respective point-to-point Interface 470 (shown as Interfaces 470A, 470B, 470C, and 470D), and each SLC further interfaces to the TLC via Bus 430 (shown as 430A and 430B.) For example, SLC 460A interfaces to IP 450A via Interface 470A and to TLC 410 via Bus 430A. Similarly, SLC 460C interfaces to IP 450C via Interface 470C and to TLC 410 via Bus 430B. Each SLC caches data from the TLC as requested by the interconnecting IP 450.

IP 450 and SLC 460 may be integrated in a single device, such as in an Pentium Pro® Processing device available from the Intel Corporation. Alternatively, the IP 450 may be a A-Series Instruction Processor or a 2200-Series Instruction Processor, both commercially available from the Unisys Corporation. In this embodiment, the IP 450 is externally coupled to an SLC 460.

Memory Storage Unit (MSU)

Figure 5:
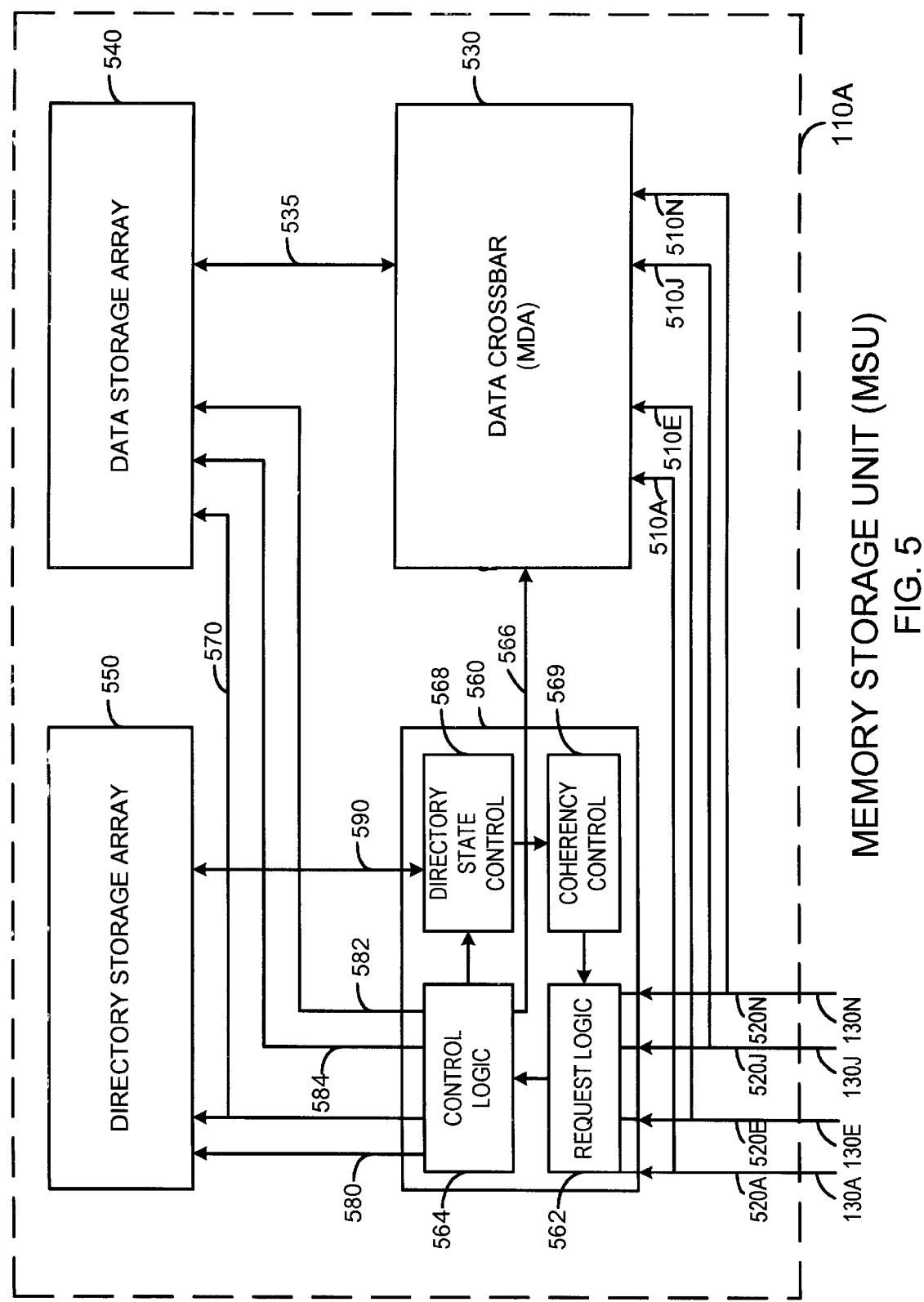
FIG. 5 is a block diagram of a Memory Storage Unit (MSU)

FIG. 5 is a block diagram of a Memory Storage Unit (MSU) 110. Although MSU 110A is shown and discussed, it is understood that this discussion applies equally to each of the MSUs 110. As discussed above, MSU 110A interfaces to each of the PODs 120A, 120B, 120C, and 120D across dedicated point-to-point MI Interfaces 130A, 130E, 130J, and 130N, respectively. Each MI Interface 130 contains Data Lines 510 (shown as 510A, 510E, 510J, and 510N) wherein each set of Data Lines 510 includes sixty-four bi-directional data bits, data parity bits, data strobe lines, and error signals (not individually shown.) Each set of Data Lines 510 is therefore capable of transferring eight bytes of data at one time. In the preferred embodiment, a memory transfer operation always involves eight eight-byte transfer operations over a respective set of Data Lines 510. Thus any transfer operation involves 64 bytes, which is termed one "cache line" of data.

Data Lines 510A, 510E, 510J, and 510N interface to the Memory Data Crossbar (MDA) 530. The MDA 530 buffers data received on Data Lines 510, and provides the switching mechanism that routes this data between the PODs 120 and an addressed location within the Data Storage Array 540 via Line 535 in a manner beyond the scope of this Application. The MDA routing function is addressed further in the co-pending Application Ser. No. 09/001,592 entitled "High-Performance Modular Memory System with Crossbar Connections", incorporated herein by reference.

The MSU further includes Data Storage Array 540 and Directory Storage Array 550. Data Storage Array 540, which is addressed in 64-byte cache lines discussed above, provides the main storage facility for Platform 100. For each of the cache lines stored in the Data Storage Array, associated status bits are stored in the Directory Storage Array 550. The status bits, referred to as the "Directory Storage Information Bits", records which IP(s) 450 or which IOP 140 has a copy of the associated cache line stored within a local cache memory. Whenever any read or write operation is performed to a cache line within the Data Storage Array 540, the Directory Storage Information Bits associated with that cache line are read from the Directory Storage Array 550. These bits are used to determine how the read or write operation should be processed. For example, these bits may indicate that the Data Storage Array may not contain the most recent copy of the requested cache line because a (possibly updated) copy of the cache line resides in a specified TLC 410. The memory operation will therefore be completed by retrieving this copy from the TLC, forcing the TLC to designate the copy as unusable (invalidate it), and providing the copy to the new requester. The Directory Storage Information Bits will be updated to reflect the newly created copy of the cache line. The algorithm which supports these operations is described in detail below.

Control for MSU 110A is provided by the Memory Controller (MCA) 560. MCA includes Request Logic 562 for queueing requests and associated commands from Address/command Lines 520 (shown as 520A, 520E, 520J, and 520N.) The commands are provided by the PODs 120 on behalf of the TLCs 410 and I/O Caches 340 to indicate what type of memory operations are to be performed. The queued requests and the associated commands are provided to Control Logic 564, which generates the routing control information for MDA 530 on Line 566. Control Logic 564 provides address signals to Directory Storage Array 550 and Data Storage Array 540 on Lines 570. Control signals are provided to Directory Storage Array 550 and Data Storage Array 540 on Lines 580 and 582, respectively. Control Logic 564 further provides Mask Signal 584 to Data Storage Array 540 to control which data signals transferred on Line 535 to the Data Storage Array are actually written to the Data Storage Array, as will be discussed further below.

MCA 560 further includes Directory State Control 568. As discussed above, during any read or write operation of a cache line stored in Data Storage Array 540, Directory State Control 568 retrieves the associated Directory State Information from the Directory Storage Array 550 across Lines 590. Directory State Control 568 then updates the Directory State Information based on the command associated with the memory request, and further based on the identity of the requesting unit. After this update is performed, the information is written back to the Directory Storage Array.

MCA 560 also includes Coherency Control 569. Coherency Control receives Directory Storage Information from Directory State Control 568. In response to this status information, Coherency Control generates control signals to the Request Logic 562 causing Request Logic to issue Functions to one or more the PODs so that the in-progress memory operation may be completed in a manner which guarantees cache coherency. Using the example provided above, assume the Directory Storage Information Bits associated with the requested cache line indicate that the most recent copy of a requested cache line is located in a specified one of the TLCs. Coherency Control 569 receives this information from Directory State Control 568 and generates control signals to Request Logic 562. Request Logic issues the appropriate Function to the POD associated with the specified TLC, thereby causing the TLC to return the requested cache line in a manner to be described below.

Directory Coherency Scheme of the Preferred Embodiment

Data coherency involves ensuring that each POD 120 operates on the latest copy of the data. Since multiple copies of the same data may exist within platform memory, including the copy in the MSU and additional copies in various I/O Caches 340 or Third Level Caches 410, some scheme is needed to control which data copy is considered the "latest" copy. The platform of the current invention uses a directory protocol to maintain data coherency. As discussed above, the directory protocol of the preferred embodiment stores Directory Storage Information Bits for each of the cache lines stored in an MSU 110. This information is monitored and updated by the MCA 560 when a cache line is read or modified. The Directory Storage Information Bits includes information that indicates which "state" a cache line is in, and further indicates which TLC(s) or I/O Cache may have a copy of the cache line.

A cache line "state" provides information about what access privileges are associated with the cache line, and further indicates which actions need to be taken by the MSU and the rest of Platform 100 before a request concerning a particular cache line may be granted. For example, the cache line data may have to be retrieved from one of the TLC or I/O Caches. In other cases, copies of the cache line may have to be invalidated within one or more TLC or I/O Caches before the MSU can provide the request cache line to the requester.

Within the system of the current invention, a cache line is always in one of the following states:

MSU Owns;
Exclusive;
Shared;
I/O Copy;
I/O Exclusive;
Deferred; or
Error.

MSU Owns State

All cache lines in the MSU are placed in the MSU Owns State after system initialization and before any cache lines have been copied into one of the system caches. This is also the state a cache line enters after it is overwritten with new data received from an I/O sub-system such as disk or tape during an "Overwrite" operation. This state indicates that the MSU has the most recent copy of the cache line. Since only the MSU is considered to have a valid copy of any cache line that is in the MSU Owns State, an error occurs if any of the TLCs or I/O Caches attempts to write to the cache line at this time.

Exclusive State

A POD may make a request to an MSU in order to modify a copy of a cache line. This request is made on behalf of a TLC 410 associated with that POD. When the TLC is provided with the requested cache line, the cache line transitions to the Exclusive State. The TLC receiving the cache line is said to be the "Owner" of that cache line, and has read/write access rights. Only one cache may be the Owner of a cache line at once. No other cache may have a copy of the cache line while another cache is the Owner. Once the cache line enters the Exclusive State, the copy of the cache line stored within the MSU is no longer considered valid. When the MSU receives requests for a cache line that is in the Exclusive State, the MSU must retrieve the cache line copy from the Owner during what is referred to as a "Return" operation.

Shared State

A POD may also request a copy of a cache line for read-only purposes. When a cache line is copied to one of the TLCs for read-only purposes, the cache line state transitions to the Shared State. When in this state, the cache line may reside within one, several, or all of the TLCs 410 in Platform 100 at once. The MSU is still considered to have a valid copy of the cache, and may provide this cache line to a TLC making a further read-only request.

I/O Copy State

Another read-only state is the I/O Copy State. In the I/O Copy State, the cache line may reside within one I/O Cache 340 and no TLCs. As is the case with the Shared State, the MSU is still considered to have a valid copy of the cache line, and modifications may not occur to the cache line within the I/O Cache. The coherency actions employed when a cache line is in this state are similar to those used when the cache line is in the Shared State and will be discussed below. This state is used to provide multiple I/O Sub-systems 360 coupled to I/O Cache 340 with access to MSU data for read-only purposes, thereby reducing the number of requests made to main memory, and I/O-to-memory access times.

I/O Exclusive State

The I/O Exclusive State allows an I/O Buffer 350 to gain an exclusive copy of the cache line with read/write access rights, thereby becoming the cache line Owner. When the cache line is in this state, no other copies may exist within any other cache in the system. Moreover, the Owner is not forced to return the cache line until it has completed the operation. That is, the MSU does not initiate the return of cache lines in this state as a result of subsequent requests by other units. Instead, the Owner returns the cache line on its own accord. This allows an I/O unit to receive a cache line from the MSU, selectively merge received from a disk or tape sub-system into the cache line, then write the cache line back to main memory after all updates are completed without an MSU performing any coherency operations. This allows system overhead to be reduced in a manner to be described below.

Deferred State

A cache line may also be in the Deferred State, indicating that the cache line state is in transition. The Deferred State is entered when a request is made for a cache line that is either in the Exclusive or I/O Exclusive State. Since the MSU is not considered to have a valid copy of a cache line that is in either the Exclusive or I/O Exclusive States, the request is deferred until the Owner of the cache line returns access rights and/or the modified copy of the cache line to the MSU. Once the MSU issues a Function to the current Owner initiating the return of the cache line, the cache line must transition to this temporary state. Otherwise, the MSU will (erroneously) issue additional Functions to the current Owner if subsequent requests for this cache line are received before the return of the cache line is completed.

Error State

Finally, a cache line may also transition to the Error State. A cache line transitions to the Error State when the MSU receives an unexpected command. For example, if a cache line is in t he MSU Ow ns State, the MSU should contain the only valid copy of the cache line within the Platform. Therefore, a command attempting to write the cache line from a cache to the MSU is considered an illegal and unexpected operation, and will cause the cache line to transition to the Error State. Once a cache line is in the Error State, it may not be accessed. It remains in the Error State until the MSU is re-initialized, or until an I/O Module 140 makes a request to write new data to the entire cache line during a n I/O Overwrite operation.

Figure 6A:
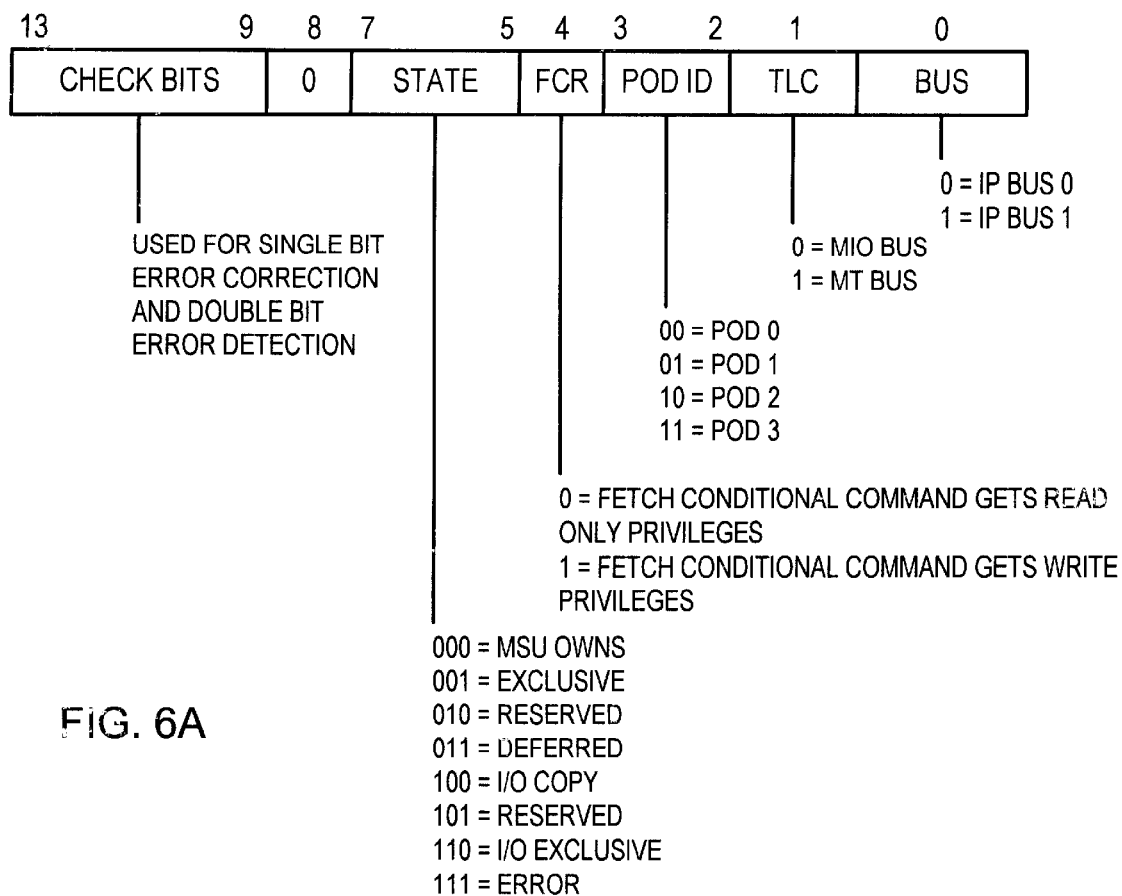
FIGS. 6A and 6B are Directory Storage Information Bit Forrnats used to encode the directory state information utilized by the algorithm of the present invention.
Figure 6B:
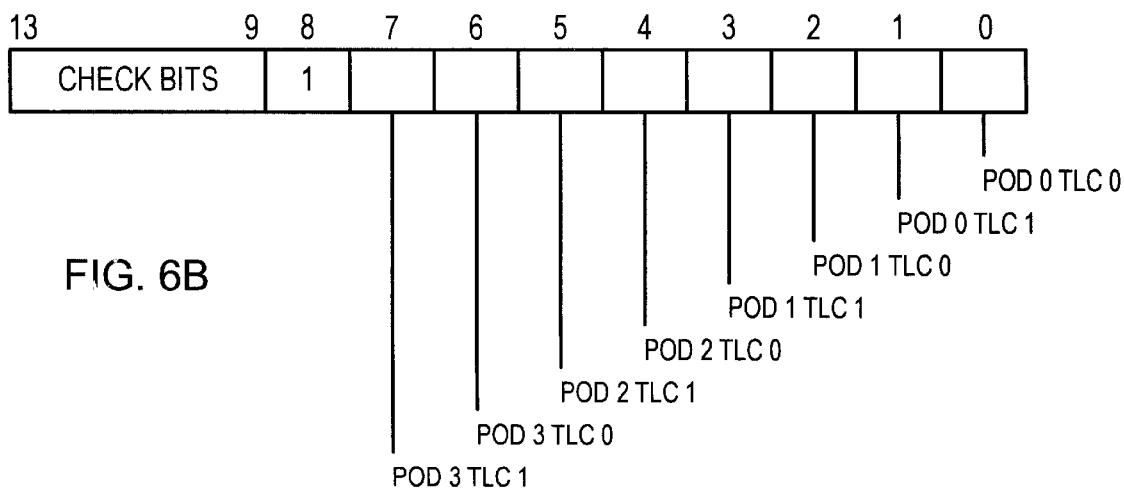

FIGS. 6A and 6B are Directory Storage Information Bit Formats used to encode the directory states described above. The Directory Storage Information Bits may be expressed in two formats. The Ownership Format, which is designated by setting Bit 8 to 0, is shown in FIG. 6A. This format is used whenever a cache line is in any other state other than the Shared State. When described in Ownership Format, the cache line state is encoded in bits 7–5. Bits 3–0 encode the identity of a TLC or I/O Cache having a copy of the cache line. More specifically, bits 3–2 identify the POD associated with the cache. Bit 1 indicates whether the cache is coupled to a MIO Interface 150 (I/O Cache) or a MT Interface 230 (TLC). Finally, bit 0 identifies the cache as one of the two TLCs 410 or I/O Caches 340 associated with a given POD.

FIG. 6B is the format used to express Directory Storage Information Bits when the associated cache line is in the Shared State. This format, which is designated by setting bit 8 to one, identifies one or more TLC(s) having a shared copy of the cache line using a vector stored in bits 7–0.

In both the Ownership and Shared Formats illustrated in FIGS. 6A and 6B respectively, bits 13–9 store the check bits that provide single bit error correction and double-bit error detection on bits 8–0 of the Directory Storage Information Bits.

Commands

As discussed above, when a POD 120 makes a read request to an MSU 110 for a cache line, the MCA will read the associated Directory Storage Information Bits, update them according to the request, and write them back to the Directory Storage Array 550. The new state of the cache line depends both on the type of request, and the identity of the cache which will obtain a copy of the cache line. The type of request is determined by the "command" provided by the requesting POD 120 on predetermined ones of the Address/command Lines 520. The identity of the requesting cache is encoded on other ones of the Address/command Lines using an encoding scheme similar to that used within the Directory Storage Information Bits. As discussed above, when the MSU receives a command from one of the PODs, the MSU may respond by issuing a Function to one or more of the POD to cause some action to occur with respect to the cache line so that cache line coherency will be maintained.

At this point, it should be mentioned that although the following discussion may refer to commands as being issued by a POD, the PODs do not initiate the requests of their own accord. Each command is issued by a POD because of a request made by an associated TLC or an I/O Cache. Furthermore, although functions are said to be issued by the MSU to a POD, it should be understood that each of these functions are issued to solicit an action within a TLC or an I/O Cache associated with the POD. In other words, logic within the POD facilitates communications functions occurring between the MSU and the TLC and I/O Caches associated with the POD.

A POD issues five types of Commands to the MSU: Fetches, Stores, I/O Commands, Special Commands, and Diagnostic Commands. Fetches generally request that data from the MSU be provided to a TLC. Stores indicate that data and/or access rights are being returned to the MSU by a TLC. I/O Commands include Commands which are counterparts to the Fetches and Stores, but which request that a cache line be transferred from, or provided to, an I/O Cache. Special Commands include commands to send a message from one POD to another. Diagnostic Commands are used to inject faults, and to perform verification functions. The Special and Diagnostic Commands are beyond the scope of this Application and will not be discussed further.

The following Table 1 is a bit map definition of the fields within the Address/command Lines 520 used to encode the Commands. The Commands are encoded using a one-bit Format Field (FMT) and a variable-length Command Code field. The effects of issuing these commands on the state of a requested cache line is discussed in detail below.

TABLE 1

Command Code Bit Encodings

| Commands | Format | Command Code |
|---|---|---|
| Fetches: | | CMD[2:0] |
| Fetch Copy | 1 | 000 |
| Fetch Original | 1 | 001 |
| Fetch Conditional | 1 | 010 |
| Fetch Ownership | 1 | 011 |
| Fetch MSU Own | 1 | 100 |
| Stores: | | CMD[5:0] |
| Flush Block | 0 | 001001 |
| Flush NAK | 0 | 001000 |
| Flush Update Copy | 0 | 001011 |
| Flush NAK Copy | 0 | 001010 |
| Flush Update Original | 0 | 001101 |
| Flush 4 Words 0–3 | 0 | 011101 |
| Flush 4 Words 4–7 | 0 | 011111 |
| Return Block | 0 | 010001 |
| Return Fast | 0 | 010011 |
| Return NAK | 0 | 010010 |
| Return Update Copy | 0 | 010101 |
| Return Copy | 0 | 010111 |
| Return NAK Copy | 0 | 010110 |
| I/O Commands: | | CMD[5:0] |
| Fetch Copy No Coherency | 0 | 000000 |
| Fetch Original No Coherency | 0 | 000010 |
| Fetch Copy I/O | 0 | 000100 |
| Overwrite | 0 | 011001 |

Fetch Commands

A Fetch command is issued when an IP makes a request to a TLC 410 and a cache miss occurs. The TLC must then provide control signals which causes the POD to issue the appropriate Fetch Command to the MSU.

As shown in Table 1, Fetch Commands are encoded by setting the Format Field (FMT) to "1", which indicates that the Command Code field is three bits wide. The system of the preferred embodiment supports the following Fetch Commands:

Fetch Copy Command

When an IP is reading a cache line to retrieve an instruction that is not present in its TLC, the TLC makes a request which causes the associated POD to issue a Fetch Copy Command to the MSU. In response to this command, the MSU must obtain the latest copy of the cache line so that it can be provided to the requesting TLC. In some instances, for example, when the cache line is in the Shared or MSU Owns State, the MSU will already have the latest copy of the cache line. In other cases, the MSU must obtain the cache line and/or ownership rights from other units. For example, the MSU will issue a Return-Copy Function to any other TLC having write permission for the cache line, thus causing this Owner TLC to return the write permission along with the updated cache line. It may be noted that the previous Owner TLC may retain a read-only copy of the cache line. The Fetch Copy Command will also cause the MSU to issue a Purge Function to an I/O Cache having a read-only copy of the cache line in the I/O Copy State. The Purge Function causes the copy to be invalidated. As discussed above in reference to the I/O Copy State, this invalidation of a read-only copy is necessary because an I/O Cache may not retain a copy of a cache line, even under read-only conditions, at the same time the cache line is resident within a TLC. Finally, if the MSU receives a Fetch Copy Command and an I/O Cache has a copy of the cache line with write-permission, that is, a copy in the I/O Exclusive State, the MSU will "defer" processing of the command. This is because the I/O Cache is allowed to retain the copy with write permission until the I/O Cache acts without solicitation to return it to the MSU. The deferral of requests is discussed further below. Once the MSU has the most recent copy of the cache line data, a copy of the cache line is provided to the requesting TLC and the cache line is placed in the Shared State.

Fetch Original Command

If an IP requests write access for a cache line and a cache miss results within the associated TLC, the TLC makes a request which causes the associated POD to issue a Fetch Original Command to the MSU. As discussed above, the MSU must obtain the latest copy of the cache line so that it can be provided to the requesting TLC. If the cache line is in the MSU Owns State, the cache line and ownership rights may be provided directly to the requesting POD to be provided to the TLC. Otherwise, the MSU must obtain the cache line and ownership rights by issuing the appropriate function to the units currently having access rights to the cache line. If the cache line is in the Shared State, the MSU issues Purge Functions to each of the TLCs having a copy of the cache line so that the copies are invalidated. If the cache line is in the Exclusive State, the MSU issues a Return-Purge Function to the Owner TLC to cause the updated data to be returned to the MSU, and to cause invalidation of the cached copy. If an I/O cache has a read-only copy of the requested cache line, the MSU issues a Purge Function to cause invalidation of the cached data as discussed above. Finally, if an I/O Cache has a copy of the cache line in the I/O Exclusive State, request processing is deferred under the I/O Cache returns the cache upon its own accord as discussed above. Upon obtaining the most recent copy of the cache line, the MSU provides it to the requesting TLC, and the cache line is placed in the Exclusive State with a new Owner.

Fetch Conditional Command

Under certain circumstances generally involving the retrieval of operands, a cache miss to a TLC will cause the associated POD to issue a Fetch Conditional Command. When an MSU receives this command, it will obtain the latest copy of the cache line in a manner similar to that discussed above. It will then provide the requesting TLC with read/write or read-only access rights to the cache line based on a prediction algorithm that takes into account the current state and the historical access patterns of the cache line. The prediction algorithm is described in detail in the Co-Pending Application Ser. No. 08/964,626 entitled "Memory Optimization State", which is incorporated herein by reference in its entirety. The prediction algorithm may be varied by altering the state of Directory Storage Information Bit 4 as indicated in FIG. 6A. The prediction algorithm associated with the Fetch Conditional Command is beyond the scope of this Application and will not be discussed further.

Fetch Ownership Command

A Fetch Ownership Command is issued by a POD when an IP seeks to modify a read-only copy of a cache line in the associated TLC. The MSU verifies that the cache line is in the Shared State, issues Purge Functions to all of the other TLCs having a read-only copy of the cache line, then provides the write permission to the requesting TLC. Since the data is already present in the cache, no data is transferred to the TLC. It should be noted that if the MSU receives this command and the Directory Storage Information Bits indicate that the cache line is either not in the Shared State, or is not stored within the requesting TLC, an error has occurred. The cache line is placed in the Error State as will be discussed further below.

Fetch MSU Own Command

A Fetch MSU Own Command is issued by a POD to force a cache line to be returned to the MSU Owns State. When a POD issues this command, it operates like any other Fetch-type command. The MSU may be required to use one of the functions described above to retrieve all outstanding copies of the cache line in question. After the cache line is retrieved, the cache line data is provided to the requesting POD as in any other Fetch. However, in this case, the cache line state transitions to the MSU Owns and the data provided to the requesting POD is simply discarded. The Fetch MSU Own Command provides a mechanism which forces data updates to be returned to the MSU so that the Platform 100 is readied to undergo a dynamic partitioning function whereby the system is partitioned into multiple independently operational sub-systems.

Flush Commands

A POD generally issues a flush-type command when cache lines are aged from a TLC or I/O Cache. As shown in Table 1, Flush Commands are encoded by setting the Format Field (FMT) of the Address/command Lines 520 to "0", which indicates that the Command Code is six bits wide. The following Flush Commands may be issued by a POD as a result of a TLC initiated operation:

Flush Block Command

The most frequently used flush command is the Flush Block Command, which is used by a TLC to age out an entire cache line that has been modified within the TLC. In response to this command, the cache line copy is invalidated within the cache, the data is written back to the MSU, and the cache line state transitions to MSU Owns. If the MSU receives a Flush Block Command from a unit other than a TLC, or from a TLC that does not have write permission for the cache line, an error is detected, and the state transitions to the Error State. That is, only a TLC that is the Owner of a cache line may issue a Flush Block Command.

Flush NAK Command

A POD issues a Flush NAK Command when an unmodified cache line is aged from a TLC that had read/write access privileges. Since the cache line has not been modified within the cache, no data is actually returned to the MSU, but the access privileges formerly held by the TLC are relinquished. The cache line state transitions to MSU Owns. In a manner similar to that discussed above, an error is detected if this command is received from a TLC that is not designated by the Directory Storage Information Bits as having a copy of the cache line, and the cache line state transitions to the Error State.

Flush Update Copy Command

A Flush Update Copy Command is issued to write a modified cache line from a TLC back to the MSU while allowing the TLC to keep a copy of the cache line with read-only permission. The cache line state transitions from the Exclusive State to the Shared State when the MSU receives the cache line data and this command.

Flush NAK Copy Command

A Flush NAK Copy Command is issued by a POD when an associated TLC releases read/write access rights, but maintains read-only access rights, of an unmodified cache line. Since the cache line is unmodified, no data transfer is needed. The cache line state transitions from the Exclusive to the Shared State.

Flush Update Original Command

A POD issues a Flush Update Original Command when a TLC is providing the most recent copy of an updated cache line to the MSU, but is maintaining read/write permission. The state of the cache line is not affected by this command.

Flush 4 Words 0–3 Command, and Flush 4 Words 4–7 Command

The Flush 4 Words 0–3, and Flush 4-Words 4–7 Commands are needed to support Instruction Processors that have internal cache memories operating on 32-byte (4 word) cache lines instead of 64-byte (8-word) cache lines supported by the MSU of the current embodiment. Therefore, these commands direct the MSU to modify only half of an 8-word cache line, while the other half of the cache line remains unchanged. For example, the Flush 4 Words 0–3 transfers an 8-word cache line to the MSU, but only Words 0–3 are actually written to the MSU, while the existing MSU data for Words 4–7 are retained. The Flush 4-Words 4–7 Command operates similarly, except Words 4–7 of the 8-Word cache line are overwritten within the MSU. The partial cache line write operation is performed by asserting Mask Signal 584 to Data Storage Array 540 (FIG. 5) during the four transfer operations involving the selected Words, thereby enabling Data Storage Array to store the associated data signals. The Mask Signal is de-asserted during the transfer of the remaining (un-selected) Words, which are effectively discarded. After this command is performed, the TLC retains read/write permission, that is, the cache line remains in the Exclusive State.

Return Commands

As discussed above, an MSU may have to obtain the latest copy of a cache line before a request may be granted. To obtain this latest copy, the MSU issues return-type functions including the Return-Copy, Return-Purge, and Return-Purge-No-Data Functions discussed above. These return-type functions cause a TLC to return cache line data and/or permission rights to the MSU. When the TLC responds to these functions, the data and/or permission rights are returned by the associated POD along with one of the Return Commands, which are encoded by setting the Format Field (FMT) of the Address/command Lines 520 to "0" as shown in Table 1. This also designates the Command Code Field of the Address/command Lines 520 as occupying bits 5–0. The following Return Commands are supported in the system of the preferred embodiment:

Return Block Command

A Return Block Command is used in the following two scenarios. In the first scenario, the MSU receives either a Fetch Original or a Fetch Original No Coherency Command, and the Directory Storage Information Bits indicate that another TLC is the Owner of the requested cache line. The MSU sends a Return Purge Function, and the POD associated with the Owner TLC thereafter responds by returning the updated cache line data and all access rights along with the Return Block Command. In the second scenario, an I/O Module, via its associated POD, issues this command when returning an updated cache line and read/write access rights to the MSU. As discussed above, the return of a cache line by an I/O Module occurs without any coherency action on the part of the MSU when the cache line is in the I/O Exclusive State.

Return Fast Command

A POD issues a Return Fast Command when a TLC is returning all access rights for an unmodified copy of a cache line that had been held in the Exclusive State. Even though the cache line was not modified by the TLC, the TLC returns the data to the MSU so that it may be routed via the MDA 530 to the requesting one of the PODs since this is faster than retrieving the cache line from the MSU. The unmodified cache line need not be written to the MSU.

Return NAK Command

A Return NAK Command is issued by a POD in response to receiving a Return Purge Function from an MSU for a cache line that has (just recently) been aged from the TLC. The POD issues this command to indicate that all access rights have already been relinquished. In a second type of situation, the POD sends this command in response to receiving a Return-Purge-No-Data Function from the MSU that was issued because of an Overwrite Command. In this scenario, the command informs the MSU that the purge of the TLC(s) has been completed. In yet another type of situation, the POD issues this command on behalf of an associated I/O Module that is returning ownership, but not data, for a cache line that was held in the I/O Exclusive State but which was never modified.

Return Update Copy Command

A POD issues a Return Update Copy Command on behalf of a TLC that is retaining read-only access rights, but that is returning write access rights and updated data to the MSU. This Command is issued when a POD receives a Return Copy Function to the TLC indicating that another TLC is seeking a read-only copy of the cache line. This command causes the cache line to transition to the Shared State.

Return Copy Command

A Return Copy Command is issued by a POD that is returning an unmodified copy of a cache line along with write access rights from the TLC to the MSU, but which is retaining a read-only copy of the cache line. As is the case with the Return Update Copy Command, this command is issued after a POD receives a Return Copy Function indicating that another TLC is seeking a read-only copy of the cache line. Although the unmodified returned data need not be written back to the MSU, it may be provided to another requesting POD as discussed above with respect to the Return Fast Command. This is done because retrieving the unmodified cache line from the TLC is faster than retrieving it from the Data Storage Array 540 within the MSU. After the MSU receives this command, the cache line will transition to the Shared State.

Return NAK Copy Command

The Return NAK Copy Command is similar to the Return Copy Command except that the unmodified cache line data is not returned to the MSU. This command is used only in several special instances in which, for reasons beyond the scope of this Application, the return of data is undesirable.

I/O Commands

A POD issues an I/O Command when an I/O Module wants to read from, or write to, a cache line within an MSU 110. As shown in Table 1, I/O Commands are encoded by setting the Format Field (FMT) of the Address/command Lines 520 to "0". This further designates that the Command Code Field of the Address/command Lines 520 occupies bits 5–0. The following I/O Commands may be issued by a POD as a result of an operation initiated by an I/O Module 140:

Fetch Copy No Coherency Command

A POD issues a Fetch Copy No Coherency Command to the MSU when an associated I/O Module 140 requests a read-only copy of a cache line that will not be entered into the I/O Cache. Instead, the cache line is used as a snap-shot to be written to an I/O sub-system such as occurs during a standard write operation performed to disk as represented by Line 370 of FIG. 3. Since the data will not be stored within the I/O Cache 340, the MSU need not issue a Purge Function upon receiving subsequent requests for access to this cache line. The I/O Module is responsible for re-issuing a new fetch-type command to obtain the latest copy of the associated cache line when such a copy is needed. If an MSU receives this command when a TLC or an I/O Cache has a read-only copy of the cache line, the cache is allowed to retain the cache line and the read-only privileges. If the MSU receives this command when a TLC has write permission to the cache line, the MSU issues the appropriate function to the cache line Owner, thereby causing the Owner to return the most recent copy of the data to the MSU. For example, if a TLC has write access to a cache line (the cache line is in the Exclusive State), the MSU issues a Return-Copy Function to the TLC. This causes the TLC to return write-access rights along with the cache line data to the MSU, but allows the TLC to retain a read-only copy of the cache line. The cache line is written to the MSU, the cache line state is set to Shared, and the cache line is also provided to the I/O Module so that the I/O snap-shot will include the most recent copy of the data. Finally, if this command is received when the requested cache line is in the I/O Exclusive state, the request is deferred until the cache line is returned by the I/O Module performing an in-progress merge operation so that the most recent copy of the data may be provided to create the snap-shot.

As discussed above, the Fetch Copy No Coherency Command allows a snap-shot of memory to be created using the most recent copy of memory data, but does not place any future coherency burdens on an MSU. That is, an MSU will not track the copy within its Directory Storage Array 550, and will not be required to retrieve the cache line copy because of a later request from another unit. This is allowable because the snap-shot copy is not used to perform actual on-going processing. Furthermore, system efficiency is increased by allowing any cache having a copy of the cache line when this command is issued to retain a read-only copy so that processing may continue.

Fetch Original No Coherency Command

Another command associated with I/O processing is the Fetch Original No Coherency Command. This command is issued to the MSU when an I/O Module 140 requests write access to a cache line, generally for purposes of doing a partial cache line write operation. Before the MSU may supply the requested cache line to the I/O Module, the MSU may first have to obtain the latest copy of the cache line in a manner discussed above. Depending on the state of the cache line, this may involve issuing a Return-Purge Function to a TLC, or deferring the request processing until another I/O Module with write permission returns the cache line without prompting. Alternatively, the MSU may have to issue Purge Functions to invalidate any read-only copies existing in one or more TLCs, or in an I/O Cache. As discussed above, these Purge Functions are necessary because when a cache line copy exists within an I/O Cache, it must be the only cached copy in the Platform 100. After the necessary functions are issued by the MSU, the most recent copy of the data is provided to the I/O Module and the cache line state is modified to I/O Exclusive.

Once in the I/O Exclusive State, an I/O Buffer 350 retains a cache line until any merge operations to that cache line are completed. This is necessary so that a cache line is not returned to an MSU in a partially updated state, which could result in processing errors. Therefore, any request made by an MSU to retrieve the cache line prior to the time the I/O merge operation is completed will be unsuccessful, resulting in wasted system overhead. For this reason, the I/O Module is allowed to retain a cache line until an associated merge operation is completed, then return the cache line to the MSU without solicitation. The MSU will not issue any coherency functions associated with cache lines in the I/O Exclusive State. Since the MSU depends on the I/O Module to return the cache lines without prompting, the I/O Module must not retain Ownership for extended periods of time.

The partial cache line write operations associated with Fetch Original No Coherency Commands are performed in the I/O Modules so that the MSUs are not forced to perform the relatively complex and time-consuming merge operations associated with merging the new data into the existing cache line. Off-loading these operations to the I/O Modules therefore reduces system overhead. It may be noted that if data received from an I/O sub-system is to completely overwrite a cache line so that none of the original MSU data is retained, an Overwrite Command (discussed below) is used in lieu of the Fetch Original No Coherency Command.

Fetch Copy I/O Command

The Fetch Copy I/O Command is another command associated with I/O operations. This command allows an I/O Module to obtain a read-only copy of a cache line in its I/O Cache 340. Upon receiving a Fetch Copy I/O Command, an MSU may first have to issue one of the Return-type or Purge Functions in the manner described above. The cache line transitions to the I/O Copy State upon completion of this command. It should be noted that when an I/O Module includes a copy of a cache line held in the I/O Copy State, the I/O Module is subject to receiving coherency functions from the MSU which will prompt the I/O Module to relinquish the I/O access rights. This is in contrast to the situation described above with respect to a cache line held in the I/O Exclusive State.

Overwrite Command

The Overwrite Command is initiated by an I/O Module to write data received from an I/O sub-system to a cache line in the MSU. This command is used to completely overwrite the old cache line data. The cache line state transitions to MSU Owns, and the MSU issues a Purge Function to any TLC(s) or any other I/O Module having a read-only copy of the cache line. If a TLC holds a copy of the cache line with write permission, the MSU must issue a Return-Purge-No-Data to the TLC so that the TLC responds with a Return NAK Command to be discussed below. Until the MSU receives the Return NAK Command, the MSU ignores any Flush-type Commands from the TLC, since these flush operations are associated with an obsolete copy of the cache line.

State Diagram of the MSU Storage Algorithm

Figure 7:
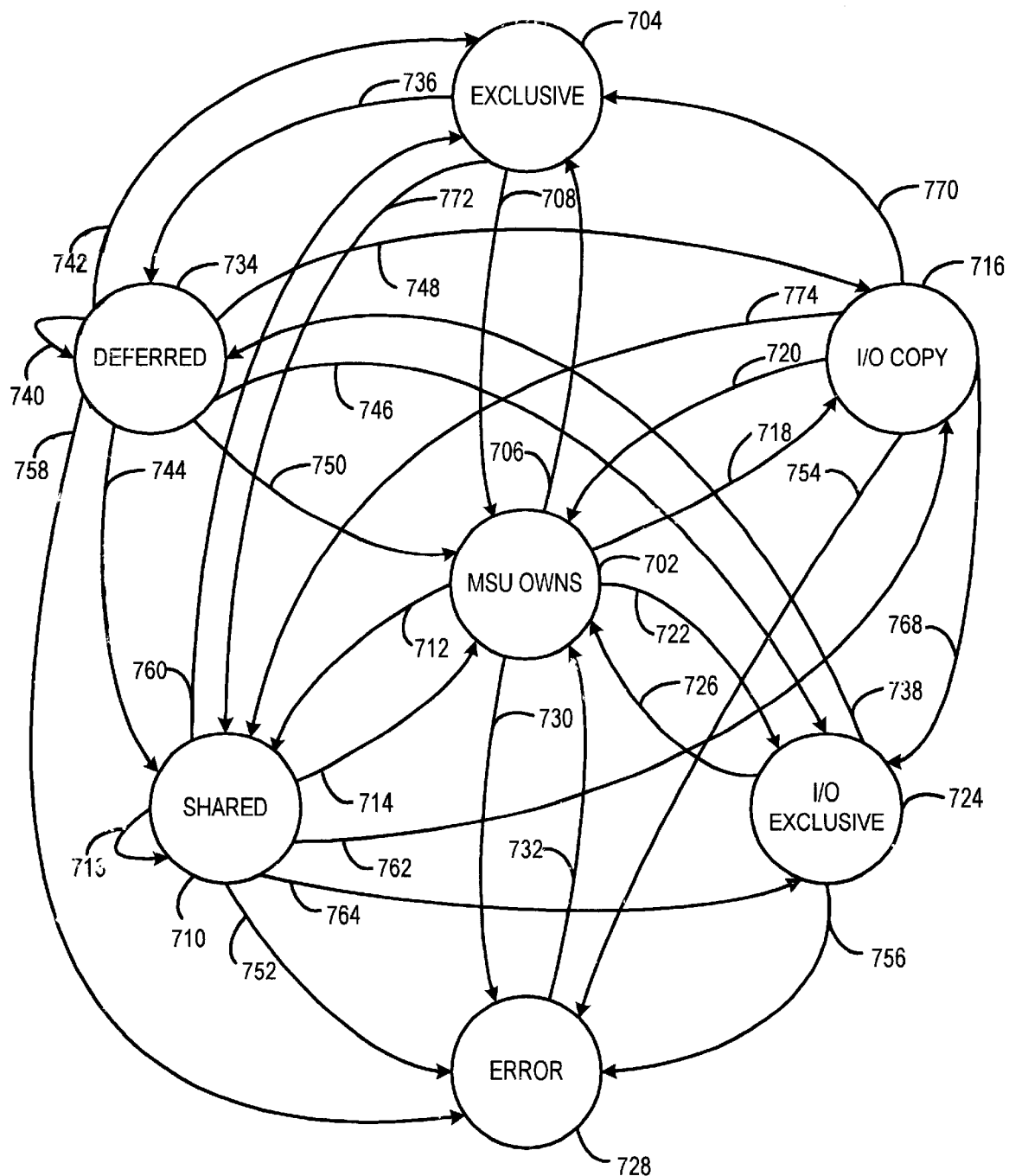
FIG. 7 is a state diagram illustrating the algorithm used to maintain cache coherency in the shared main memory system.

FIG. 7 is a state diagram of the MSU Storage Algorithm depicting the transitions between the legal states of a cache line within an MSU of the current system. This diagram further illustrates the manner in which the above-described commands are used within Platform 100.

Each of the cache lines in the MSU is initialized to the state of MSU Owns 702 upon system power up or upon reset. When a cache line is in this state, only the MSU retains a valid copy of the cache line, and the MSU is responsible for providing the cache line data to a requesting unit. From the MSU Owns State, a cache line may transition to most of the other states based on commands received from the PODs as follows. When an MSU receives a Fetch Original Command from a TLC 410, the MSU provides the data along with read/write access rights to the requesting TLC, and the cache line transitions to the Exclusive State 704 as shown by Line 706. The identity of the new Owner is recorded in the Directory Storage Information Bits using the Ownership Format shown in FIG. 6A. As discussed above, the identify of the TLC is encoded in Bits 3–0. The cache line transitions from the Exclusive State 704 back to the MSU Owns State 702 when the cache line is aged from the TLC 410 that owns that data, as shown by Line 708. This transition is initiated by the POD issuing a Flush Block or Flush NAK Command on behalf of the Owner TLC on Address/command Lines 520. If the data has been modified, the updated data must be provided along with the Flush Block Command to the MSU via Data Lines 510. If the data has not been modified, only ownership, not data, is returned to the MSU along with the Flush NAK Command.

A cache line transitions from the MSU Owns State 702 to the Shared State 710, as represented by Line 712, when the MSU receives a Fetch Copy Command from a TLC. A copy of the cache line is provided to the requesting TLC, and the identity of the requester is recorded in the Directory Storage Information Bits using the Shared Format shown in FIG. 6B discussed above. Once in the Shared State, other TLCs 410 within Platform 100 may request a copy of the cache line as shown by Line 713. The data is provided to the requester, the vector included within Directory Storage Information Bits 7–0 is modified to reflect the additional copy, and the cache line is maintained in the Shared State. A copy of the a cache line may concurrently reside within one, several, or all TLCs while the cache line is in the Shared State.

A cache line transitions from the Shared State 710 back to the MSU Owns State 702 when the MSU receives an Overwrite Command as shown by Line 714. As discussed above, an Overwrite Command indicates that new data received from an I/O sub-system, for example, from disk, is overwriting the specified cache line. All cached copies of the overwritten cache line data are now considered to be obsolete. The MSU therefore issues a Return-Purge-No-Data Function to any TLC 410 having read/write access to the cache line. This TLC need only return Ownership, not data, to the MSU using the Return NAK Command discussed above. Alternatively, the MSU issues Purge Functions to any TLC(s) having read-only copies of the cache line so that the TLC(s) mark the copies as invalid. The transition indicated by Line 714 can also be initiated when a POD issues a Fetch MSU Own Command to force the cache line back to the MSU in preparation for dynamic system partitioning operations as discussed above.

The reception of a Fetch I/O Copy Command causes a cache line to transition from the MSU Owns State 702 to the I/O Copy State 716 as indicated by Line 718. In response to receiving the Fetch I/O Copy Command, the MSU delivers the cache line data with read-only permission to the requesting one of the I/O Caches 340. The identity of the requesting I/O Cache is recorded in Directory Storage Information Bits 3–0 as shown in FIG. 6A. Unlike the Shared State 710 discussed above, the I/O Copy State only permits a single I/O Cache to maintain a copy of the cache line at any given time, even though this state is associated with read-only access. This is a design choice made in the preferred embodiment to reduce the number of Directory Storage Information Bits that must be utilized to track each cache line. An alternate embodiment allowing both I/O Caches and TLCs to simultaneously maintain read-only copies of the cache line could be readily provided by allowing for additional Directory Storage Bits per cache line.

A cache line transitions from the I/O Copy State 716 to the MSU Owns State 702 when an I/O Module other than the one having the copy of the cache line sends a Overwrite Command to an MSU 110 as indicated by Line 720. The MSU stores the data received with the Overwrite Command, updates the Directory Storage Information Bits to reflect the state change, and issues a Purge Function to the I/O Module having the old copy of the cache line data. This transition can also occur when a POD issues a Fetch MSU Own Command, which forces the I/O Cache to return read-only access rights in preparation for dynamic system partitioning operations as discussed above.

A cache line may transition from the MSU Owns State 702 to the I/O Exclusive State 724 when the MSU receives a Fetch Original No Coherency Command from an I/O Module 140, as indicated by Line 722. As a result, the MSU provides a copy of the cache line to the requesting I/O Module to be stored in the associated I/O Buffer 350, and the identity of the requesting I/O Module is indicated by Directory Storage Information Bits 3–0 as shown in FIG. 6A.

A cache line transitions back to the MSU Owns State 702 from the I/O Exclusive State 724 when an I/O Module returns the cache line along with the Return Block Command as shown by Line 726. As discussed above, this occurs without the MSU issuing any additional functions. This allows the I/O Module to complete a partial modification of a cache line without imposing any additional overhead on the MSU that may result from coherency issues. In other words, the I/O Module assumes the responsibility of maintaining cache coherency when a cache line transitions to this state.

Finally, a cache line may transition from the MSU Owns State 702 to the Error State 728 as indicated by Line 730. This occurs when a cache line is in the MSU Owns State and one of the PODs issues a Flush or Return-type Command. This is considered an error because the MSU Owns State indicates that no other valid copy of the cache line exists outside of the main memory, and therefore no Flush or Return operation should be initiated. When Error State 728 is entered, the cache line is no longer considered usable, and an MSU returns an Error Function to any requester seeking access to this cache line. The cache line is only returned to a valid MSU Owns State if it is overwritten pursuant to an Overwrite Command as represented by Line 732. The Overwrite Command provides a mechanism whereby transient memory faults may be recovered by retrieving a valid copy of cache line data from a peripheral device such as a disk or tape sub-system.

In addition to the states mentioned above, the MSU algorithm further includes a transient state referred to as Deferred State 734. As shown in FIG. 7, this state is entered from either the Exclusive State 704 or from the I/O Exclusive State 724. When a request is received that will cause a transition to the Deferred State, the Directory Storage Information Bits 7–5 are set to indicate the Deferred State, and bits 3–0 remain unchanged and therefore identify the previous Owner of the cache line. The Deferred State is used as a mechanism to control the processing of multiple pending requests to the same cache line in a first-in first-out manner. Without this state, the MSU could erroneously issue duplicate functions to a TLC for the return of a cache line held in the Exclusive State as will be discussed below. This would not occur if the cache line were in the I/O Exclusive State since the MSU does not initiate return operations in these instances as discussed above.

A cache line enters the Deferred State 734 from the Exclusive State 704 whenever the MSU receives any Fetch-type or I/O Fetch-type Command as represented by Line 736. When the MSU receives one of these commands, the MSU updates the Directory Storage Information Bits to reflect the transition to the Deferred State, and further responds by issuing the appropriate function to the current Owner of the cache line based on the type of Fetch Command. For example, if the Fetch requests a read-only copy, and the current Owner is a TLC, the MSU issues a Return Copy Function that causes the Owner to relinquish write-access rights while retaining a read-only copy of the cache line. The cache line remains in the Deferred State until the Owner returns the cache line.

A cache line also enters the Deferred State 734 from the I/O Exclusive State 724 whenever the MSU receives any Fetch-type or I/O Fetch-type Command as represented by Line 738. When the MSU receives one of these commands, the MSU updates the Directory Storage Information Bits to reflect the transition to the Deferred State. The MSU does not issue any coherency functions to initiate return of the data, but instead waits for the I/O Cache to return the data and access rights on its own so that system overhead may be minimized.

FIG. 8 is a block diagram of the Deferred Request Table (DRT), which is a storage structure within Directory State Control 568 (FIG. 5) used to place a cache line in the deferred state. The MSU records an entry in the DRT for each request that is deferred in the manner discussed above. Each entry includes a Command Field 810 for storing the Command associated with the request, and further includes the Requester ID Field 820 for storing the identity of the requesting unit. Each entry also has a Request Address Field 830 for storing the address of the requested cache line. If other requests for the same cache line are received while a cache line is in the Deferred State, an additional entry is added to the DRT for each request. All entries associated with the same cache line are linked in a first-in first-out fashion using a Link Field 840 that may store a pointer to another entry. Therefore, an entry is added to the end of a linked list when a Fetch-type command is received for a cache line in the Deferred State. Furthermore, each time a Return-type command is received from the previous Owner of the cache line, an entry is removed from the appropriate linked list. The DRT ensures that requests are handled in a first-in, first-out manner. It also prevents the issuance of unnecessary Return-type Functions to a POD as the result of multiple pending requests to the same cache line, thereby eliminating unnecessary system overhead.

Returning now to FIG. 7, a cache line remains in the Deferred state as long as at least one entry remains on the DRT for that cache line address, as indicated by Line 740. A cache line exits the Deferred State when the MSU receives a Return-type command for a cache line that is associated with only a single entry in the DRT. The returned cache line is written to the MSU, and is also provided to the requesting unit. The MSU removes the entry from the DRT, and a state transition is made based on the type of Fetch Command associated with this entry. If the Command is a Fetch Original Command, the state transitions to the Exclusive State 704, as represented by Line 742. If the Command is a Fetch Copy, the state transitions to the Shared State 710 as indicated by Line 744. A Fetch Copy Conditional Command may cause either of these transitions based on the prediction algorithm. A Fetch Original No Coherency Command causes the state to transition to the I/O Exclusive State 724 as indicated by Line 746, and a Fetch I/O Copy causes a transition to the I/O Copy State 716 as indicated by Line 748. If the request being processed is associated with the Fetch Copy No Coherency Command, the cache line data is provided to the requesting I/O Module, and the cache line transitions to the Shared State as shown by Line 744. If the request being processed is associated with the Overwrite Command, the cache line transitions to the MSU Owns State as shown by Line 750. In this case, any data subsequently returned to the MSU by a previous Owner with a Return-type Command is discarded as obsolete. This transition also occurs because a POD issued a Fetch MSU Own Command which either caused the Deferred State to be entered initially, or which was received by the MSU while the cache line was already in the Deferred State. As discussed above, this command forces the MSU Owns state to be entered in preparation for dynamic system partitioning operations.

In all of the above-mentioned state transitions, the new access rights and cache line state are entered in the Directory Storage Information Bits as shown in FIGS. 6A or 6B. The cache line data is delivered to the requesting TLC or I/O Cache, and access rights are granted based on the type of Command issued with the request as discussed above.

The MSU algorithm of the current invention also provides improved error coverage. When the MSU receives an unexpected command for a cache line, the cache line state transitions to the Error State 728. For example, this occurs when a cache line is in the MSU Owns State and one of the PODs issues a Flush or Return-type Command as shown by Line 730 and discussed above. A similar transition occurs when a cache line is in the Shared State 710 or the I/O Copy State 716 as indicated by Line 752 and Line 754, respectively. Since the MSU does not recognize any of the caches as having write access rights for a cache line in the MSU Owns, Shared, or I/O Copy States, the reception of a Flush or Return-type Command is considered illegal at that time. A cache line may also transition from the I/O Exclusive State to the Error State if a Flush or Return-type Command is received from any TLC, or from an I/O Cache that is not the cache line Owner as shown by Line 756. Finally, the cache line transitions from the Deferred to the Error State if the Owner of the cache line does not respond with the appropriate Return-type command as shown by Line 758. This occurs, for example, if the MSU issues a Return-Purge Function to the current Owner requesting the return of data and all access privileges, and the Owner responds with a Return Update Copy Command indicating the Owner is retaining read access privileges.

As described above, once a cache line has entered the Error State 728, the cache line is no longer considered usable, and an MSU returns an Error Function to any requester seeking access to this cache line. The cache line is only returned to a valid MSU Owns State if it is overwritten pursuant to an Overwrite Command as represented by Line 732. The Overwrite Command provides a mechanism whereby transient memory faults may be recovered by retrieving a valid copy of cache line data from a peripheral device such as a disk or tape sub-system.

Several other state transitions are represented by the state diagram of FIG. 7. A cache line transitions directly from Shared State 710 to Exclusive State 704 when a TLC having read-only access to the cache line issues a Fetch Ownership Command to obtain read/write access rights as indicated by Line 760. The MSU issues Purge Functions to all other TLCs having read-only access to the cache line, and updates the Directory Storage Information Bits accordingly. A cache line transitions directly from Shared State 710 to the I/O Copy State 716, as indicated by Line 762, when the MSU receives an I/O Copy Command indicating that an I/O Cache requests a read-only copy of the cache line. This is necessary because a TLC and an I/O Cache may not simultaneously retain a read-only copy of the same cache line as discussed above. A cache line transitions directly from Shared State 710 to the I/O Exclusive State 724, as indicated by Line 764, when the MSU receives a Fetch Original No Coherency Command indicating an I/O Module wants a copy of the cache line with read/write access. A cache line moves from the I/O Copy State 716 to the I/O Exclusive State 724, as indicated by Line 768, when an I/O Module has a read-only copy of the cache line and the same or a different I/O Module now requests permission to perform a partial modification to that cache line. In either instance, the MSU issues a purge function to the I/O Module having the read-only copy so that the data is purged from the I/O Cache. The MSU then supplies the cache line to the requesting I/O Module where it is stored in the I/O Buffer. A cache line transitions from the I/O Copy State 716 to the Exclusive State 704 as indicated by Line 770 when the MSU receives a Fetch Original Command from a TLC indicating that the requesting unit wants a copy of the cache line with read/write access rights. A cache line transitions from the Exclusive State 704 to the Shared State 710 when a TLC that holds the cache line issues a Flush Copy Command to flush the cache line back to the MSU while retaining a read-only copy, as is represented by Line 772. Finally, a cache line may transition from the I/O Copy State 716 to the Shared State 710 when a TLC requests a read-only copy of a cache line that is held by an I/O Cache as a read-only copy as shown by Line 774.

While various embodiments of the present invention have been described above, it should be understood that they have been presented by way of example only, and not as a limitation. Thus, the breadth and scope of the present invention should not be limited by any of the above-described exemplary embodiments, but should be defined only in accordance with the following claims and their equivalents.

What is claimed is:

1. For use in a data processing system having multiple instruction processors (IPs) and multiple input/output (I/O) systems, a memory system, comprising:

a shared main memory to store addressable blocks of data signals;

one or more IP caches each coupled to one or more of the IPs and each coupled to said shared main memory to store selectable ones of said addressable blocks of data signals received from said shared main memory;

one or more I/O memories each coupled to an associated one or more of the I/O systems and each coupled to said shared main memory to store selectable ones of said addressable blocks of data signals received from said shared main memory;

a directory storage device coupled to said shared main memory to store directory information for each associated one of said addressable blocks, said directory information indicating which of said one or more IP caches and which of said one or more I/O memories is storing an associated addressable block of data signals, said directory information further including access privilege indicators for said associated addressable block of data signals, said access privilege indicators being selected from a first set of access privilege indicators if at least one of said IP caches stores said associated addressable block, said access privilege indicators being selected from a second set of access privilege indicators if only said one or more I/O memories stores said associated addressable block, wherein each of said IP caches and each of said I/O memories includes circuits to issue commands to said shared main memory, each of said commands to request a copy of a requested one of said addressable blocks of data signals, and further including a control circuit coupled to ones of said IP caches and ones of said I/O memories to receive said issued commands, and to determine, based on a selected one of said issued commands for said requested one of the addressable blocks of data signals, and further based on said associated one of said access privilege indicators for said requested one of said addressable blocks of data signals, which one of said access privilege indicators is to be associated with said requested one of said addressable blocks of data signals upon completion of execution of said selected one of said issued command, and wherein each of said IP caches and ones of said I/O memories may return modified said requested ones of said addressable blocks of data signals to said shared main memory to be stored during return operations, and wherein said directory storage device includes an error circuit responsive to said return operations such that any of said return operations causes an error signal to be issued if said return operation is performed by any of said IP caches or any of said I/O memories not indicated by said directory information as storing any one of said modified requested ones of said addressable blocks of data signals.

2. The memory system of claim 1, wherein ones of said access privilege indicators indicate exclusive cache states such that any of said requested addressable blocks associated with said exclusive cache states may be stored within at most one of said IP caches or one of said I/O memories at any given time.

3. The memory system of claim 2 wherein if a requesting one of said IP caches or a requesting one of said I/O memories makes a request to said shared main memory for a requested one of said addressable blocks of data signals associated with one of said exclusive cache states, and said requested one of said addressable blocks of data signals is stored within a storing one of said IP caches, said control unit causes said storing one of said IP caches to provide said requested one of said addressable blocks of data signals to said shared main memory, and further causes said requested one of said addressable blocks of data signals to be associated with a different said cache state.

4. The memory system of claim 2 wherein if a requesting one of said IP caches or said I/O memories makes a request to said shared main memory for a requested one of said addressable blocks of data signals associated with one of said exclusive cache states, and said requested one of said addressable blocks of data signals is stored within a storing one of said I/O memories, said shared main memory allows said storing one of said I/O memories to retain said requested one of said addressable blocks of data signals, which is maintained in said one of said exclusive cache states.

5. For use in a data processing system having multiple instruction processors (IPs) and multiple input/output (I/O) systems, a memory system, comprising:

a shared main memory to store addressable blocks of data signals;

one or more IP caches each coupled to one or more of the IPs and each coupled to said shared main memory to store selectable ones of said addressable blocks of data signals received from said shared main memory;

one or more I/O memories each coupled to an associated one or more of the I/O systems and each coupled to said shared main memory to store selectable ones of said addressable blocks of data signals received from said shared main memory;

a directory storage device coupled to said shared main memory to store directory information for each associated one of said addressable blocks, said directory information indicating which of said one or more IP caches and which of said one or more I/O memories is storing an associated addressable block of data signals, said directory information further including access privilege indicators for said associated addressable block of data signals, said access privilege indicators being selected from a first set of access privilege indicators if at least one of said IP caches stores said associated addressable block, said access privilege indicators being selected from a second set of access privilege indicators if only said one or more I/O memories stores said associated addressable block, and further including a control circuit to determine, based on said access privilege indicators for an associated addressable block of data signals, the number of said IP caches or the number of said I/O memories which may store said associated addressable block of data signals, and the manner in which said addressable block of data signals may be read from, or written to, within the memory system, and wherein predetermined ones of the I/O memories are I/O caches, and wherein access privilege indicators are provided to allow ones of said addressable blocks of data signals to be stored by ones of said I/O caches to be used by said coupled ones of the I/O systems for read-only purposes.

6. For use in a data processing system having multiple instruction processors (IPs) and multiple input/output (I/O) systems, a memory system, comprising:

a shared main memory to store addressable blocks of data signals;

one or more IP caches each coupled to one or more of the IPs and each coupled to said shared main memory to store selectable ones of said addressable blocks of data signals received from said shared main memory;

one or more I/O memories each coupled to an associated one or more of the I/O systems and each coupled to said shared main memory to store selectable ones of said addressable blocks of data signals received from said shared main memory;

a directory storage device coupled to said shared main memory to store directory information for each associated one of said addressable blocks, said directory information indicating which of said one or more IP caches and which of said one or more I/O memories is storing an associated addressable block of data signals, said directory information further including access privilege indicators for said associated addressable block of data signals, said access privilege indicators being selected from a first set of access privilege indicators if at least one of said IP caches stores said associated addressable block, said access privilege indicators being selected from a second set of access privilege indicators if only said one or more I/O memories stores said associated addressable block, and further including a control circuit to determine, based on said access privilege indicators for an associated addressable block of data signals, the number of said IP caches or the number of said I/O memories which may store said associated addressable block of data signals, and the manner in which said addressable block of data signals may be read from, or written to, within the memory system, and wherein predetermined ones of the I/O memories are I/O buffers, and wherein access privilege indicators included within said second set of access privilege indicators are provided to allow associated ones of said addressable blocks of data signals each to be stored within any one of said I/O buffers, and whereby ones of the I/O systems may read from, or write to, said addressable blocks of data signals stored within said I/O buffers coupled to said ones of the I/O systems.

7. For use in a data processing system having multiple instruction processors (IPs) and multiple input/output (I/O) systems, a memory system, comprising:

a shared main memory to store addressable blocks of data signals;

one or more IP caches each coupled to one or more of the IPs and each coupled to said shared main memory to store selectable ones of said addressable blocks of data signals received from said shared main memory;

one or more I/O memories each coupled to an associated one or more of the I/O systems and each coupled to said shared main memory to store selectable ones of said addressable blocks of data signals received from said shared main memory;

a directory storage device coupled to said shared main memory to store directory information for each associated one of said addressable blocks, said directory information indicating which of said one or more IP caches and which of said one or more I/O memories is storing an associated addressable block of data signals, said directory information further including access privilege indicators for said associated addressable block of data signals, said access privilege indicators being selected from a first set of access privilege indicators if at least one of said IP caches stores said associated addressable block, said access privilege indicators being selected from a second set of access privilege indicators if only said one or more I/O memories stores said associated addressable block, wherein each of said IP caches and each of said I/O memories includes circuits to issue commands to said shared main memory, each of said commands to request a copy of a requested one of said addressable blocks of data signals, and further including a control circuit coupled to ones of said IP caches and ones of said I/O memories to receive said issued commands, and to determine, based on a selected one of said issued commands for said requested one of the addressable blocks of data signals, and further based on said associated one of said access privilege indicators for said requested one of said addressable blocks of data signals, which one of said access privilege indicators is to be associated with said requested one of said addressable blocks of data signals upon completion of execution of said selected one of said issued command, and wherein one of said control circuit includes a circuit responsive to one of said commands that is a fetch MSU own command to cause requested one of said addressable blocks of data signals to become associated with predetermined ones of said access privilege indicators that indicate that said shared main memory is prepared to be partitioned into multiple systems.

8. For use in a data processing system having multiple instruction processors (IPs) and multiple input/output (I/O) systems, a memory system, comprising:

a shared main memory to store addressable blocks of data signals;

one or more IP caches each coupled to one or more of the IPs and each coupled to said shared main memory to store selectable ones of said addressable blocks of data signals received from said shared main memory;

one or more I/O memories each coupled to an associated one or more of the I/O systems and each coupled to said shared main memory to store selectable ones of said addressable blocks of data signals received from said shared main memory;

a directory storage device coupled to said shared main memory to store directory information for each associated one of said addressable blocks, said directory information indicating which of said one or more IP caches and which of said one or more I/O memories is storing an associated addressable block of data signals, wherein each of said IP caches and each of said I/O memories includes circuits to issue commands to said shared main memory, each of said commands to request a copy of a requested one of said addressable blocks of data signals, and further including a control circuit coupled to ones of said IP caches and ones of said I/O memories to receive said issued commands, and to determine, based on a selected one of said issued commands for said requested one of the addressable blocks of data signals, and further based on said associated one of said access privilege indicators for said requested one of said addressable blocks of data signals, which one of said access privilege indicators is to be associated with said requested one of said addressable blocks of data signals upon completion of execution of said selected one of said issued command, and wherein each of said IP caches and ones of said I/O memories may return modified said requested ones of said addressable blocks of data signals to said shared main memory to be stored during return operations, and wherein said directory storage device includes an error circuit responsive to said return operations such that any of said return operations causes an error signal to be issued if said return operation is performed by any of said IP caches or any of said I/O memories not indicated by said directory information as storing any one of said modified requested ones of said addressable blocks of data signals.

* * * * *